(12) United States Patent
Gillo et al.

(10) Patent No.: US 8,632,408 B2
(45) Date of Patent: Jan. 21, 2014

(54) ENTERTAINMENT DEVICE AND METHOD

(75) Inventors: Tomas Owen Gillo, London (GB); Scott Christopher Waugaman, London (GB); Mitchell Goodwin, London (GB); Mark Horneff, London (GB); Nick Ryan, London (GB)

(73) Assignee: Sony Computer Entertainment Europe Limited (GB)

( * ) Notice: Subject to any disclaimer, the term of this patent is extended or adjusted under 35 U.S.C. 154(b) by 507 days.

(21) Appl. No.: 12/527,933

(22) PCT Filed: Feb. 29, 2008

(86) PCT No.: PCT/GB2008/000678
§ 371 (c)(1),
(2), (4) Date: Aug. 3, 2011

(87) PCT Pub. No.: WO2008/104782
PCT Pub. Date: Sep. 4, 2008

(65) Prior Publication Data
US 2012/0071244 A1    Mar. 22, 2012

Related U.S. Application Data

(60) Provisional application No. 60/892,397, filed on Mar. 1, 2007.

(30) Foreign Application Priority Data

Mar. 1, 2007  (GB) .................................. 0703974.6
Mar. 5, 2007  (GB) .................................. 0704225.2

(51) Int. Cl.
*A63F 13/00* (2006.01)

(52) U.S. Cl.
USPC ........................................... 463/42; 709/227

(58) Field of Classification Search
USPC ............................... 463/40, 42; 709/227, 228
See application file for complete search history.

(56) References Cited

U.S. PATENT DOCUMENTS

| 5,828,843 A | 10/1998 | Grimm et al. |
| 6,038,599 A | 3/2000 | Black et al. |

(Continued)

FOREIGN PATENT DOCUMENTS

| EP | 1739639 A | 1/2007 |
| JP | 2000508097 A | 6/2000 |

(Continued)

OTHER PUBLICATIONS

International Search Report and Written Opinion dated Aug. 19, 2008 from the corresponding PCT/GB2008/000678.

(Continued)

*Primary Examiner* — Arthur O. Hall
*Assistant Examiner* — Allen Chan
(74) *Attorney, Agent, or Firm* — Lerner, David, Littenberg, Krumholz & Mentlik, LLP

(57) ABSTRACT

An entertainment device operable to connect to a first on-line virtual environment comprises a group membership selector operable to select members of a group of entertainment devices connected to a first on-line virtual environment comprising a plurality of connected entertainment devices, a server evaluator operable to evaluate a plurality of servers of a second on-line virtual environment according to one or more criteria while the entertainment device is connected to the first on-line virtual environment, a server selector operable to select at least a first server of the second on-line virtual environment based upon the evaluation while the entertainment device is connected to the first on-line virtual environment, and a storage arrangement operable to cause the storage of server selection data defining the selected server.

39 Claims, 16 Drawing Sheets

(56) References Cited

U.S. PATENT DOCUMENTS

| | | | |
|---|---|---|---|
| 6,345,297 B1* | 2/2002 | Grimm et al. | 709/227 |
| 2003/0054879 A1* | 3/2003 | Schneier et al. | 463/29 |
| 2003/0130040 A1* | 7/2003 | Dripps | 463/42 |
| 2005/0026696 A1* | 2/2005 | Hashimoto et al. | 463/42 |
| 2005/0086369 A1 | 4/2005 | Mai et al. | |
| 2005/0137015 A1* | 6/2005 | Rogers et al. | 463/42 |
| 2006/0205512 A1 | 9/2006 | Watanabe et al. | |
| 2006/0287105 A1* | 12/2006 | Willis | 463/42 |
| 2006/0287106 A1* | 12/2006 | Jensen | 463/42 |

FOREIGN PATENT DOCUMENTS

| | | | |
|---|---|---|---|
| JP | 2001198363 A | 7/2001 | |
| JP | 2002263374 A | 9/2002 | |
| JP | 2002282552 | 10/2002 | |
| JP | 2002359660 A | 12/2002 | |
| JP | 2003126555 A | 5/2003 | |
| JP | 2007509405 A | 4/2007 | |
| WO | 9735258 A1 | 9/1997 | |
| WO | 2005046171 A1 | 5/2005 | |
| WO | 2006025255 A1 | 3/2006 | |

OTHER PUBLICATIONS

Linden Research et al: "Second Life" Internet Citation, [online] Jan. 1, 2003, pp. 1-8, XP002478210; Retrieved from the Internet: URL:http://en.wikipedia.org/wiki/Second_Life> [retrieved on 2007]; the whole document.

Combined Search and Examination Report under Sections 17 and 18(3) dated Sep. 3, 2007 corresponding to GB0704225.2.

Gargolinski, S. et al., Game Server Selection for Multiple Players, Proceedings of the 4th ACM Network and System Support for Games (NetGames), Hawthorne, NY, USA, Oct. 2005. Available online at: http://www.cs.wpi.edu/~claypool/papers/musst/ [downloaded Aug. 30, 2007]; See whole document.

Multiplayer Gaming, The All-Seeing Eye, Get the World's #1 Game Server Browser, Retrieved from the Internet: http://web.archive.org/web/20070224004218/http://videogames.yahoo.com/multiplayer [retrieved on Jun. 8, 2009]; p. 1 to p. 4.

www.Xbox.Com: "Play together", Retrieved from the Internet: http://www.xbox.com/en-GB/live/Play.htm [retrieved on Jun. 8, 2009] p. 1 of 1.

www.Gamespy 3D, "What is GameSpy 3D?", Retrieved from the Internet: http://www.gamespy3d.com/ [retrieved on Jun. 8, 2009]; p. 1 to 2.

Microsoft DirectPlay Overview, 2009 Microsoft Corporation, DirectPlay Technical Articles, "Microsoft DirectPlay 8.0 Feature Overview", Retrieved from the Internet: http://msdn.microsoft.com/en-us/library/ms811080(printer).aspx, p. 1 of 1.

www.gamespyarcade.com: "Play Hundreds of Online Multiplayer Games!"; Retrieved from the Internet: http://www.gamespyarcade.com/ [retrieved on Jun. 8, 2009] p. 1 of 1.

International Preliminary Report on Patentability dated Jun. 18, 2009 from corresponding PCT/GB2008/000678.

Japanese Office Action dated Mar. 12, 2013.

Dorimaga Books, Phantasy Star Online Episodes I&II. Players Guide—Ragol Globe Trotter, Softbank Publishing Co., Ltd. Mar. 17, 2003, First Edition, P85-86.

* cited by examiner

ENTERTAINMENT DEVICE AND METHOD

This invention relates to entertainment devices and methods.

In the field of multiplayer videogaming, it is of course necessary to associate multiple players within a videogame (or 'game'). Typically a game that supports a multiplayer mode will have a client-side executable (a version of the game operable to obtain data about the actions of other players and to transmit the actions of the local player) and a server-side executable, which is operable to coordinate the actions of the players within a session of the game, typically being tailored to the specific needs of the game, for example in terms of update rate, information about each player (player appearance, weapon selection, health, movement) and information about player actions, in particular determining if one player has shot another. This last element is generally determined on the server side so that different connection rates ('ping' rates) between clients and the server don't result in players appearing to miss each other; the server builds an effectively continuous model of where each player is in the game, and so operates independently of any lag in positional updates between clients.

Typically, players can join an existing game at any time, being 'spawned' at predetermined points during the game's play. Alternatively, they can join within an interval period between game sessions and wait for the next one to start, depending on the nature of the game.

Naturally, players would prefer to play with people they know, and so multiplayer systems have developed so-called 'matchmaking' services to enable friends to meet-up for online play.

Traditionally, matchmaking in on-line games follows two basic models. Either there is a dedicated system built into the game, or a third-party system runs in parallel with a selected game.

As an example of the former, dedicated system, system, Direct Play (http://msdn2.microsoft.com/en-us/library/ms811080.aspx) is a client/server system integrated within a game using a standardised application programming interface (API), in a similar manner to that by which graphics facilities are integrated within a game using the DirectX API. The game server has the facility to queue players and provides a chat system, whilst the client within the game allows users to select a particular game session, and chat with other players who are waiting, for example to determine who is there. This facility is referred to as a 'game lobby' in the DirectPlay literature.

It will be appreciated, however, that such a system is limited to the specific game and to one of a plurality of servers upon which that game is being hosted. To address this problem, as an example of the latter third-party system, GameSpy3D (http://www.gamespy3d.com/) has a client that runs separately and in parallel with the users' game. GameSpy3D supports a number of games, for which a master server list is established and from which the client on the user's computer downloads excerpts relevant to the user's selected games. The GameSpy3D client then pings these servers and lists them in order of speed of response, allowing the user to select the fastest connection. GameSpy3D also has a buddy list and chat client, allowing users to chat by text with friends, for example to coordinate their selection of a particular server.

Xbox Live (http://www.xbox.com/en-GB/live) operates in a similar fashion, being incorporated within the operating system of the Xbox® and Xbox 360® entertainment devices. Each player has a so-called 'gamertag' assigned to them, enabling them to be tracked when they are on-line, and to determine what if any game they are playing. The system also provides a chat facility and friends list similar to GamesSpy3D.

GameSpyArcade (http://www.gamespyarcade.com/) operates in a similar fashion to GameSpy3D and Xbox live, and enhances this functionality with a so-called 'buddy positioning system', in which the client software broadcasts the on-line status of friends to corresponding clients in an ongoing fashion. Users can then click on a friend to be launched onto the same server and join them in a game. Optionally a user can disconnect when playing a game to limit bandwidth usage from the client software.

Yahoo! All-Seeing Eye (http://videogames.yahoo.com/multiplayer) has a so-called 'friend-tracker' that operates in a similar fashion to the buddy positioning system of GameSpy Arcade.

However, the above systems have several disadvantages. Firstly, tracking users continually to provide output to other friends is costly in terms of bandwidth in an application (on-line gaming) where the avoidance of bandwidth limitation and associated delays is paramount. Secondly, such systems are limited in their determination of a server to either a direct assessment of server response speed, or whether a previously established friend is already in a particular game. The provided solution of a chat facility requires firstly that all the friends understand a common language, and secondly that all the friends can then successfully select the agree server from their own clients. In general, it is clear that a group of friends wishing to play a game would prefer not to spend protracted periods of time arguing over possible server numbers via text message.

The present invention seeks to mitigate or alleviate the above problems.

In a first aspect the invention provides an entertainment device operable to connect to a first on-line virtual environment, the entertainment device, the entertainment device comprising:

a group membership selector operable to select members of a group of entertainment devices connected to a first on-line virtual environment comprising a plurality of connected entertainment devices;

a server evaluator operable to evaluate a plurality of servers of a second on-line virtual environment according to one or more criteria whilst connected to the first on-line virtual environment;

a server selector operable to select at least a first server of the second on-line virtual environment based upon the evaluation whilst connected to the first on-line virtual environment; and a storage means for causing the storage of server selection data.

In a second aspect the invention provides a server arranged to administer a first on-line virtual environment, the server comprising:

a data receiver operable to receive measurements of servers of a second on-line virtual environment from member entertainment devices of a group of entertainment devices connected to a first on-line virtual environment;

a server evaluator operable to evaluate a plurality of servers of the second on-line virtual environment according one or more criteria whilst administering the first on-line virtual environment, based upon the received server measurements; and a server selector operable to select at least a first server of the second on-line virtual environment based upon the evaluation whilst administering the first on-line virtual environment.

Advantageously, the above aspects allow the players of on-line games to interact and form groups within a first on-line environment, and to move from that first on-line environment into a second, separately run online environment as an effective group without having to coordinate for themselves where or how they will join back together.

Methods of operation, as carried out in operation by the apparatus of the above aspects, provide corresponding advantages.

Further respective aspects and features of the invention are defined in the appended claims.

Embodiments of the present invention will now be described by way of example with reference to the accompanying drawings, in which.

An apparatus and method of multiplayer game access are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity in present invention embodiments.

In a summary embodiment of the present invention, a user of an entertainment device such as a Sony® Playstation 3® entertainment device (PS3) navigates within one instance of a large plurality of virtual 3D environments available from an on-line server, each populated by a comparatively small portion of the total number of other users currently on-line. Within this environment, these users are represented by human-like avatars, enabling social interaction between users and with the virtual environment itself, which may provide facilities such as pool tables, bowling alleys, arcade games and TV screens streaming on-line content. Users can meet up within the virtual environment, treating it as a virtual 'departure lounge' prior to playing the multiplayer videogame they want to play. To facilitate this, optionally the user can enter instances of the virtual environment according to for example their age, geographical location, language preference, the presence of friends from a friends list, or according to what game disk is currently loaded within their PS3. Within the virtual environment, users can chat via text or talk via audio or video codecs with each other to determine what they what to play. They can then form a group, either by selection from a menu, by standing their avatars close together, or by all moving their avatars to a specific area. Each user's entertainment device pings available game servers and deter mines the best respective speeds. The entertainment devices then share their results via a peer-to-peer link to find the best overall server with enough room for the group. Alternatively, the entertainment devices share their data with a central server supporting the virtual environment, which determines the best overall server for the group. This information is stored in a fashion accessible by the entertainment device and in a format recognisable by the relevant game, and the virtual 3D environment is exited. On each entertainment device, the relevant game is then launched and is able to retrieve the data identifying the selected server and connect to it, thereby reuniting the group within a multiplayer environment of the relevant game. In this way, a first online virtual 3D environment can be used to facilitate the organisation of players for a second online virtual 3D environment. The workings of the PS3, the virtual 3D environment, and the method of multiplayer gaming summarised above will now be described in more detail.

Figure 1:
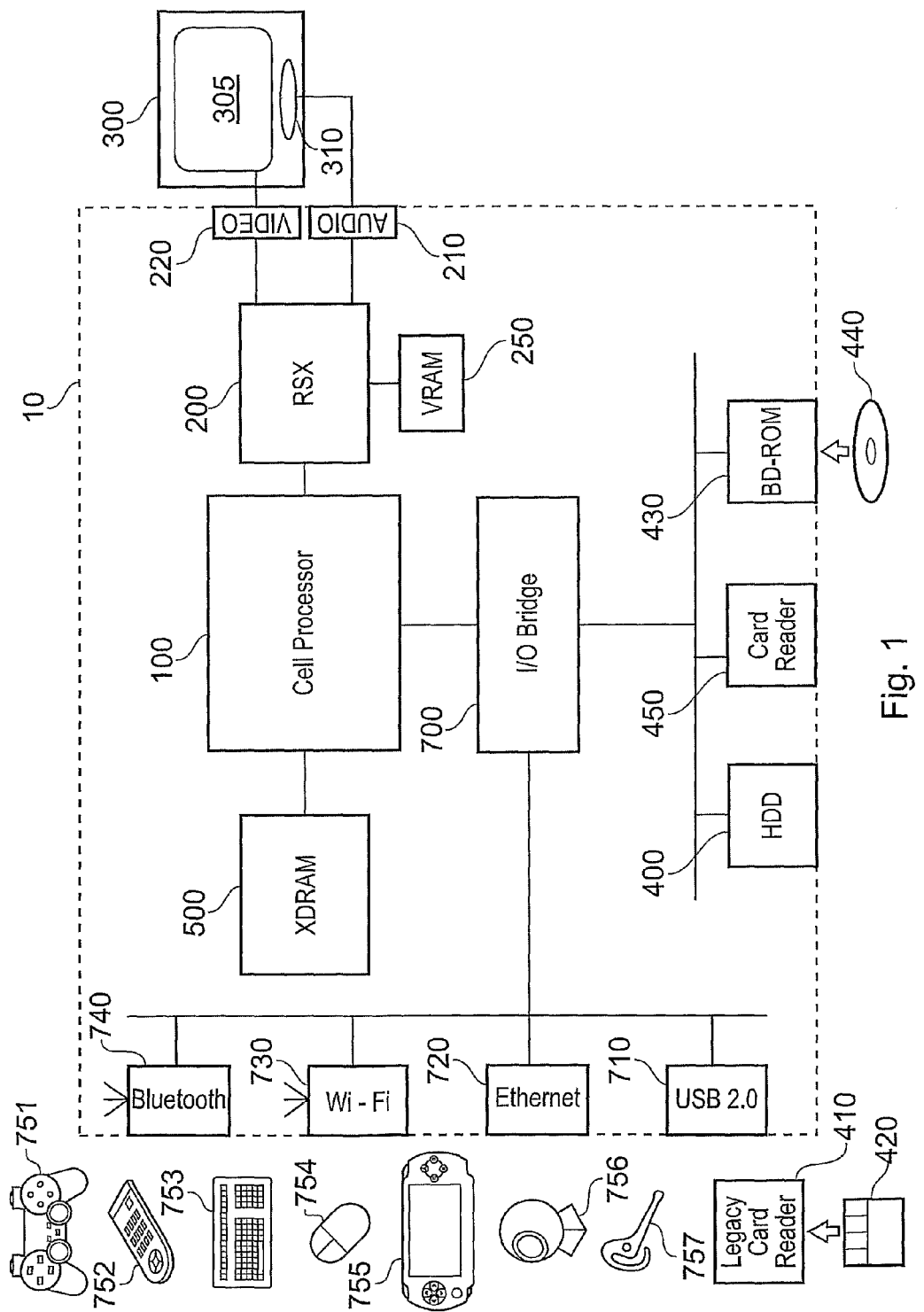
FIG. 1 is a schematic diagram of an entertainment device.

FIG. 1 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to six Universal Serial Bus (USB) 2.0 ports 710; a gigabit Ethernet port 720; an IEEE 802.11b/g wireless network (Wi-Fi) port 730; and a Bluetooth® wireless link port 740 capable of supporting of up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 2:
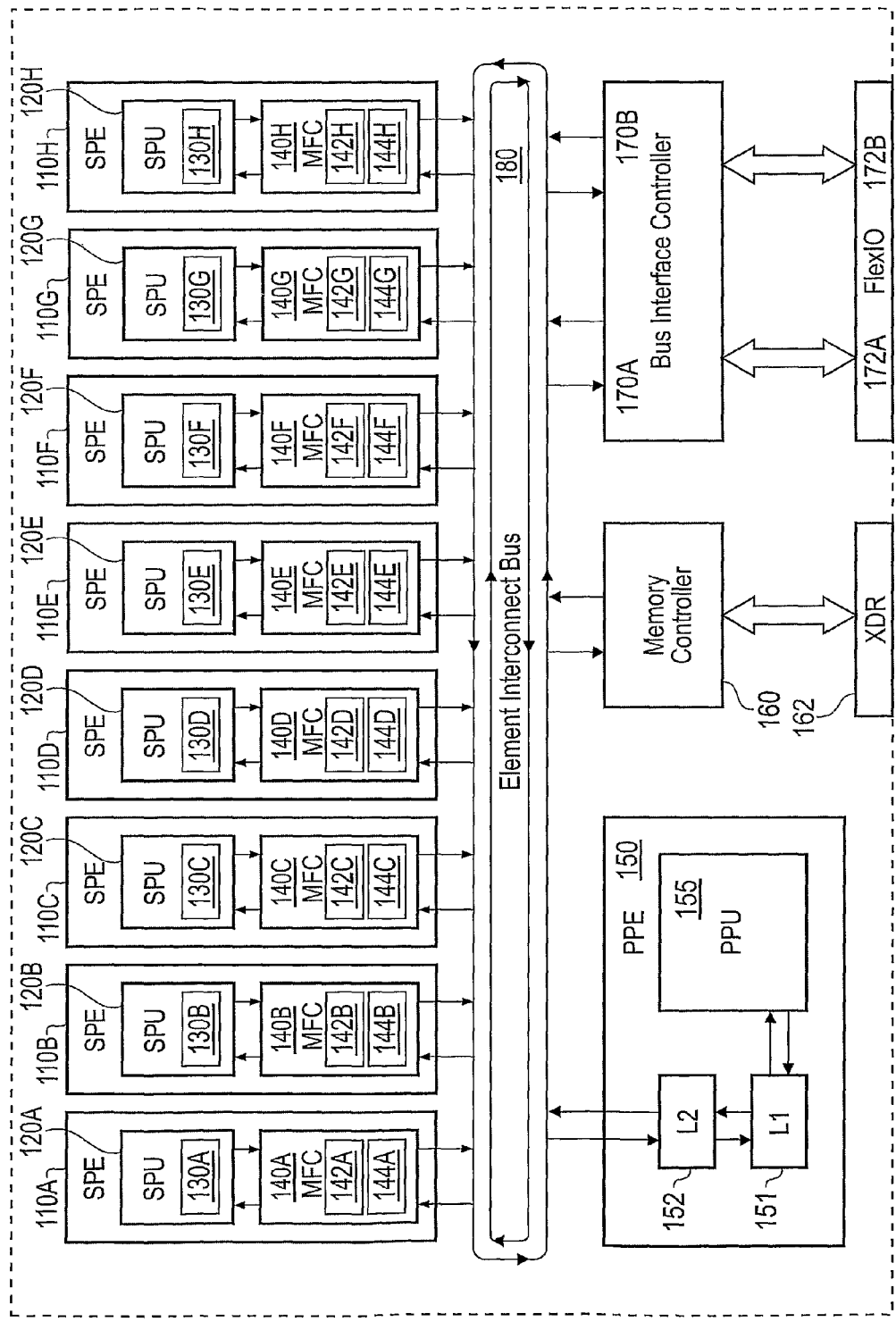
FIG. 2 is a schematic diagram of a cell processor.

Referring now to FIG. 2, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160.

The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totalling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96 B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B.

The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 3:
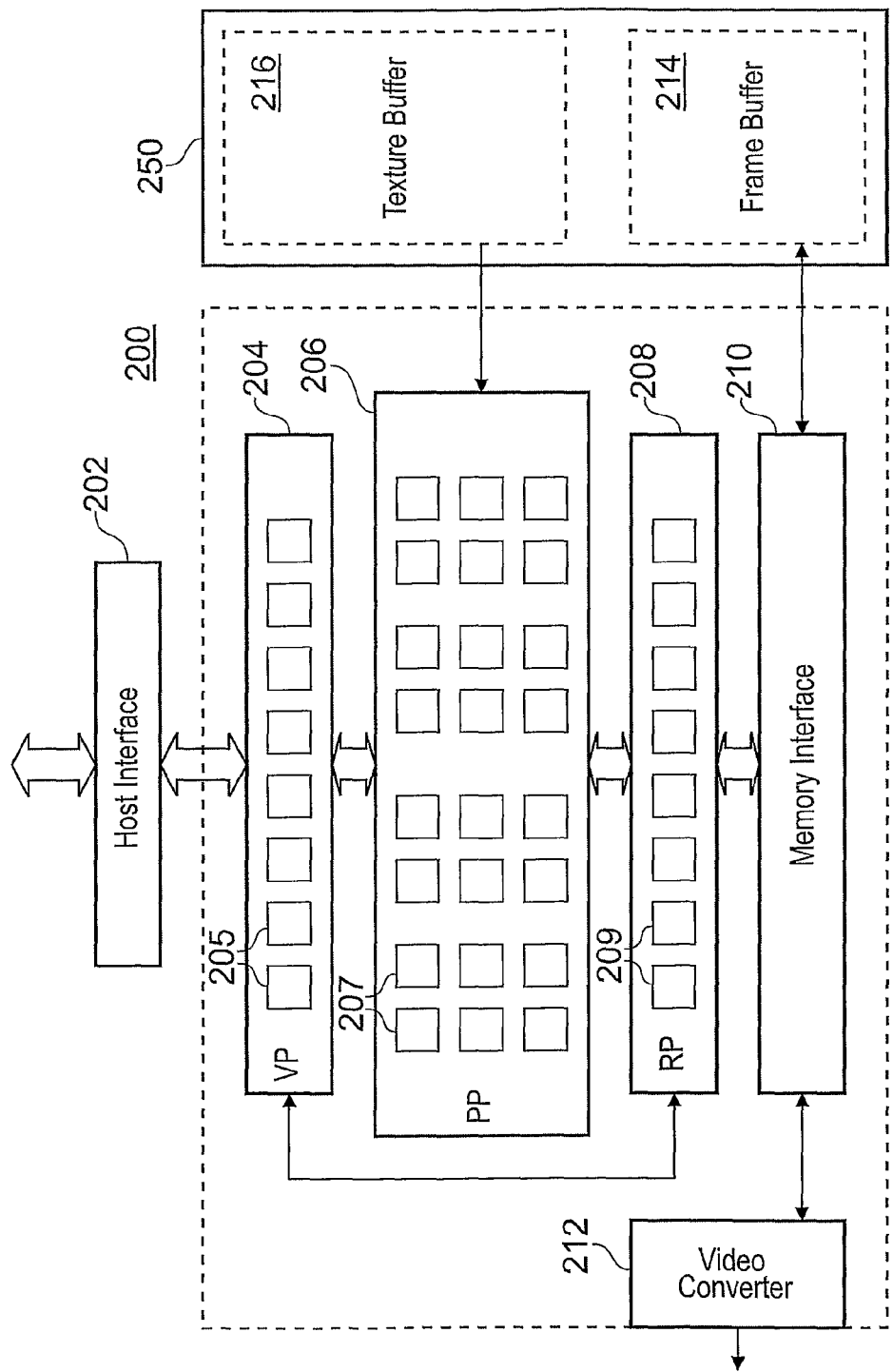
FIG. 3 is a schematic diagram of a video graphics processor.

Referring now to FIG. 3, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the functions horizontally using a game controller 751, remote control 752 or other suitable control device so as to highlight the desired function, at which point options pertaining to that function appear as a vertically scrollable list centred on that function, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demos and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

In an embodiment of the present invention, the above-mentioned online capability comprises interaction with a virtual environment populated by avatars (graphical representations) of the user of the PS3 10 and of other PS3 users who are currently online.

The software to enable the virtual interactive environment is typically resident on the HDD 400, and can be upgraded and/or expanded by software that is downloaded, or stored on optical disk 440, or accessed by any other suitable means. Alternatively, the software may reside on a flash memory card 420, optical disk 440 or a central server (not shown).

In an embodiment of the present invention, the virtual interactive environment (hereafter called the 'Home' environment) is selected from the cross-media bar. The Home environment then starts in a conventional manner similar to a 3D video game by loading and executing control software, loading 3D models and textures into video memory 250, and rendering scenes depicting the Home environment. Alternatively or in addition, the Home environment can be initiated by other programs, such as a separate game.

Figure 4:
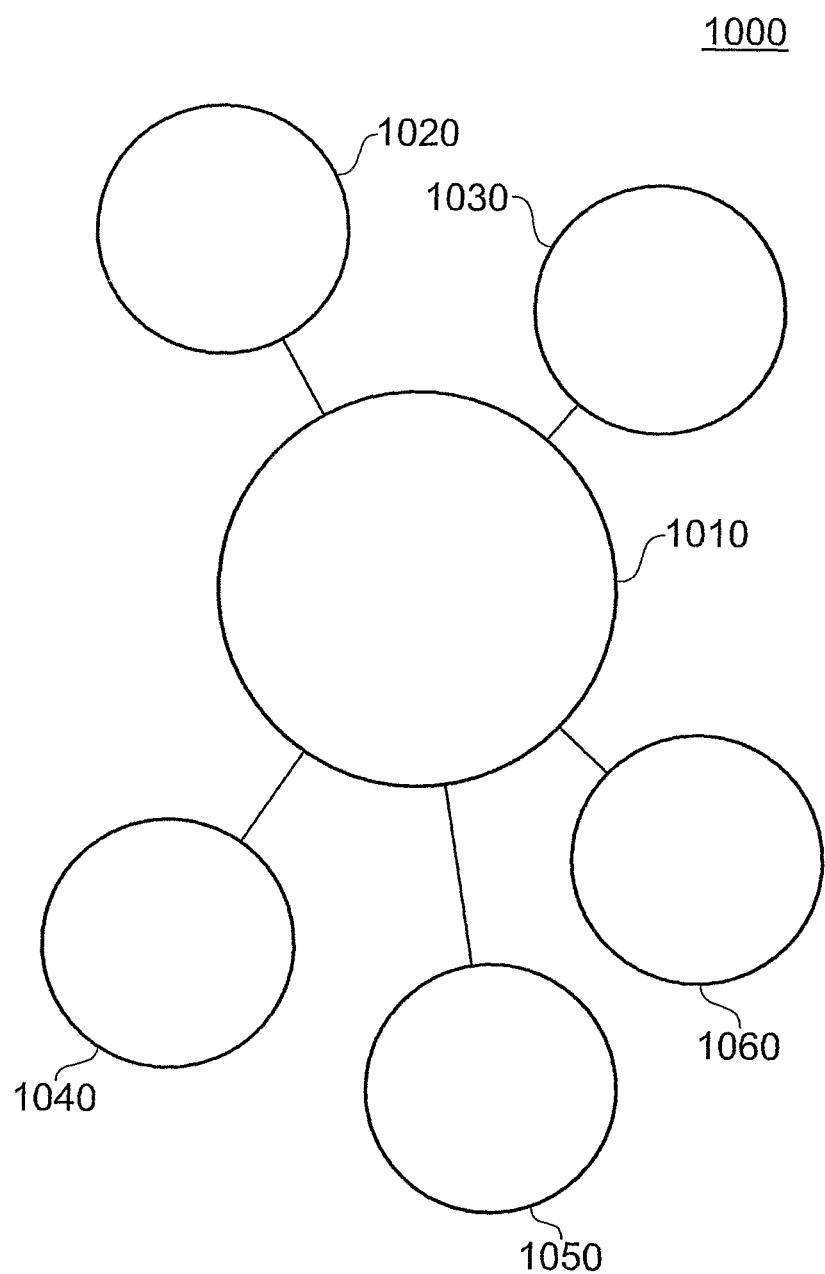
FIG. 4 is a schematic diagram of an interconnected set of game zones in accordance with an embodiment of the present invention.
Figure 5:
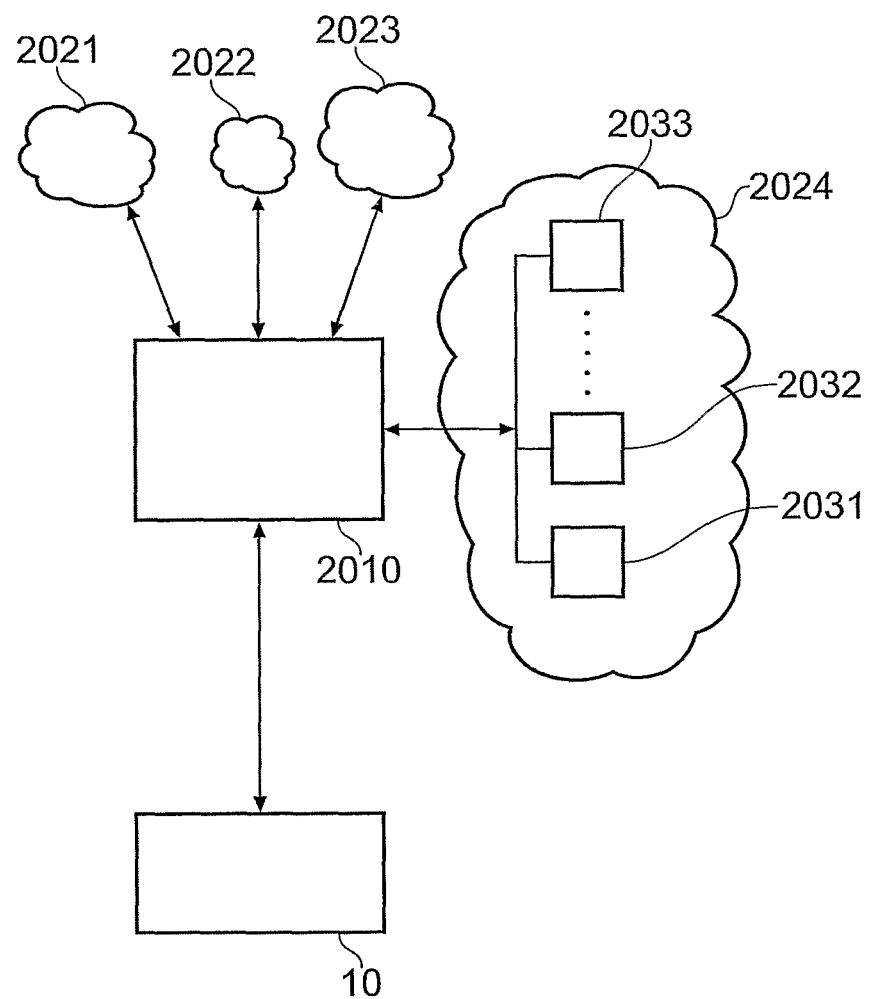
FIG. 5 is a schematic diagram of a Home environment online client/server arrangement in accordance with an embodiment of the present invention.

Referring now to FIG. 4, which displays a notional map of the Home environment, and FIG. 5, which is a schematic diagram of a Home environment online client/server arrangement, the user's avatar is spawned within a lobby zone 1010 by default. However, a user can select among other zones 1010-1060 (detailed below) of the map, causing the select zone to be loaded and the avatar to be spawned within that zone. In an embodiment of the present invention, the map screen further comprises a sidebar on which the available zones may be listed, together with management tools such as a ranking option, enabling zones to be listed in order of user preference, or such as most recently added and/or A-Z listings. In addition a search interface may allow the user to search for a zone by name. In an embodiment of the present invention, there maybe many more zones available than are locally stored on the user's PS3 at any one time; the local availability may be colour coded on the list, or the list may be filtered to only display locally available zones. If the user selects a locally unavailable zone, it can be downloaded from a Home environment Server 2010.

Figure 6A:
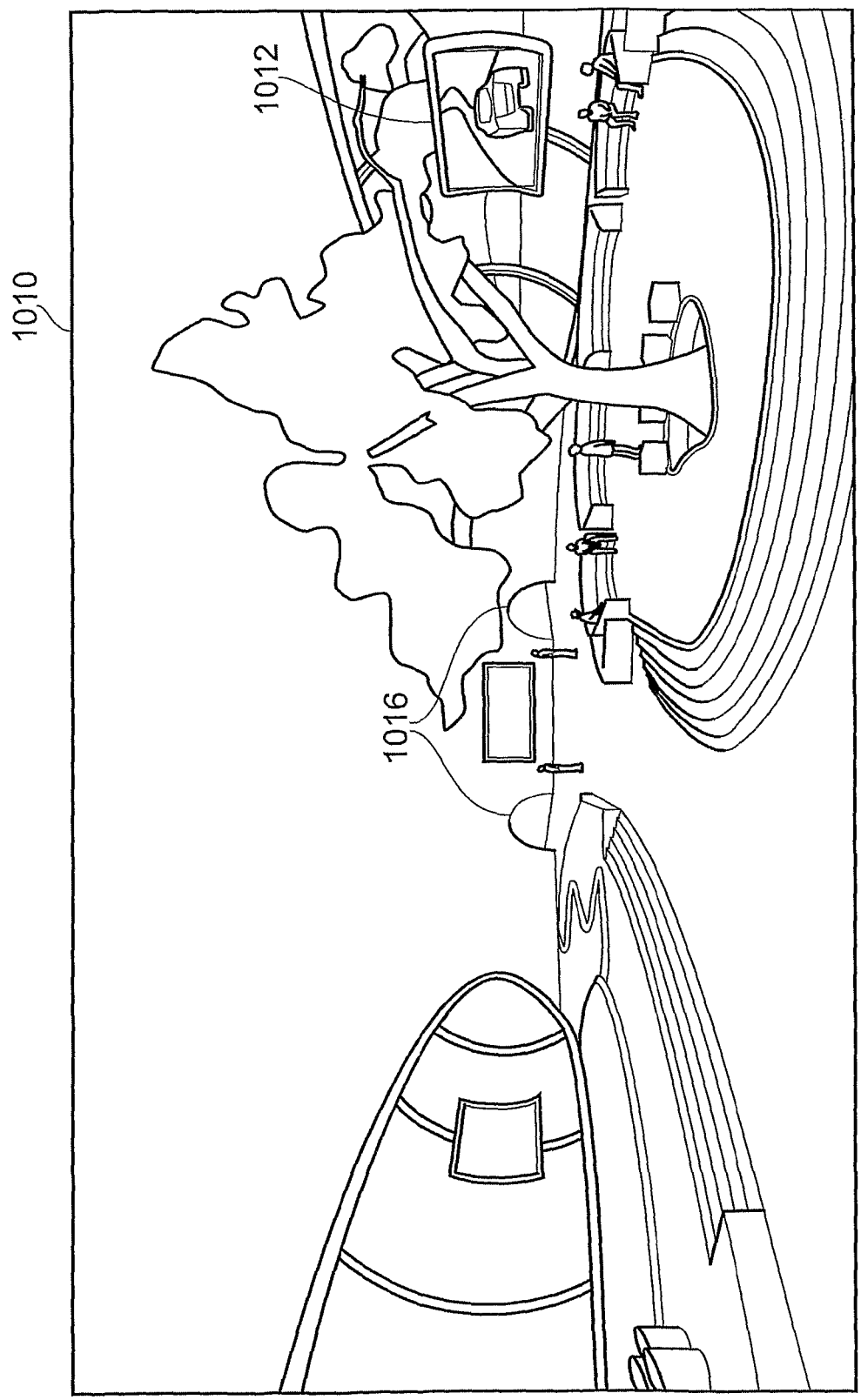
FIG. 6a is a schematic diagram of a lobby zone in accordance with an embodiment of the present invention.

Referring now to FIG. 6a, the lobby zone 1010 typically resembles a covered piazza, and may comprise parkland (grass, trees, sculptures etc.), and gathering spaces (such as open areas, single benches or rows of seats etc.) where users can meet through their avatars.

The lobby zone 1010 typically also comprises advertisement hoardings, for displaying either still or moving adverts for games or other content or products. These may be on the walls of the lobby, or may stand alone.

The lobby zone 1010 may also include an open-air cinema 1012 showing trailers, high-profile adverts or other content from third-party providers. Such content is typically streamed or downloaded from a Home environment server 2010 to which the PS3 10 connects when the Home environment is loaded, as described in more detail later.

The cinema screen is accompanied by seating for avatars in front of it, such that when an avatar sits down, the camera angle perceived by the user of the avatar also encompasses the screen.

Figure 6B:
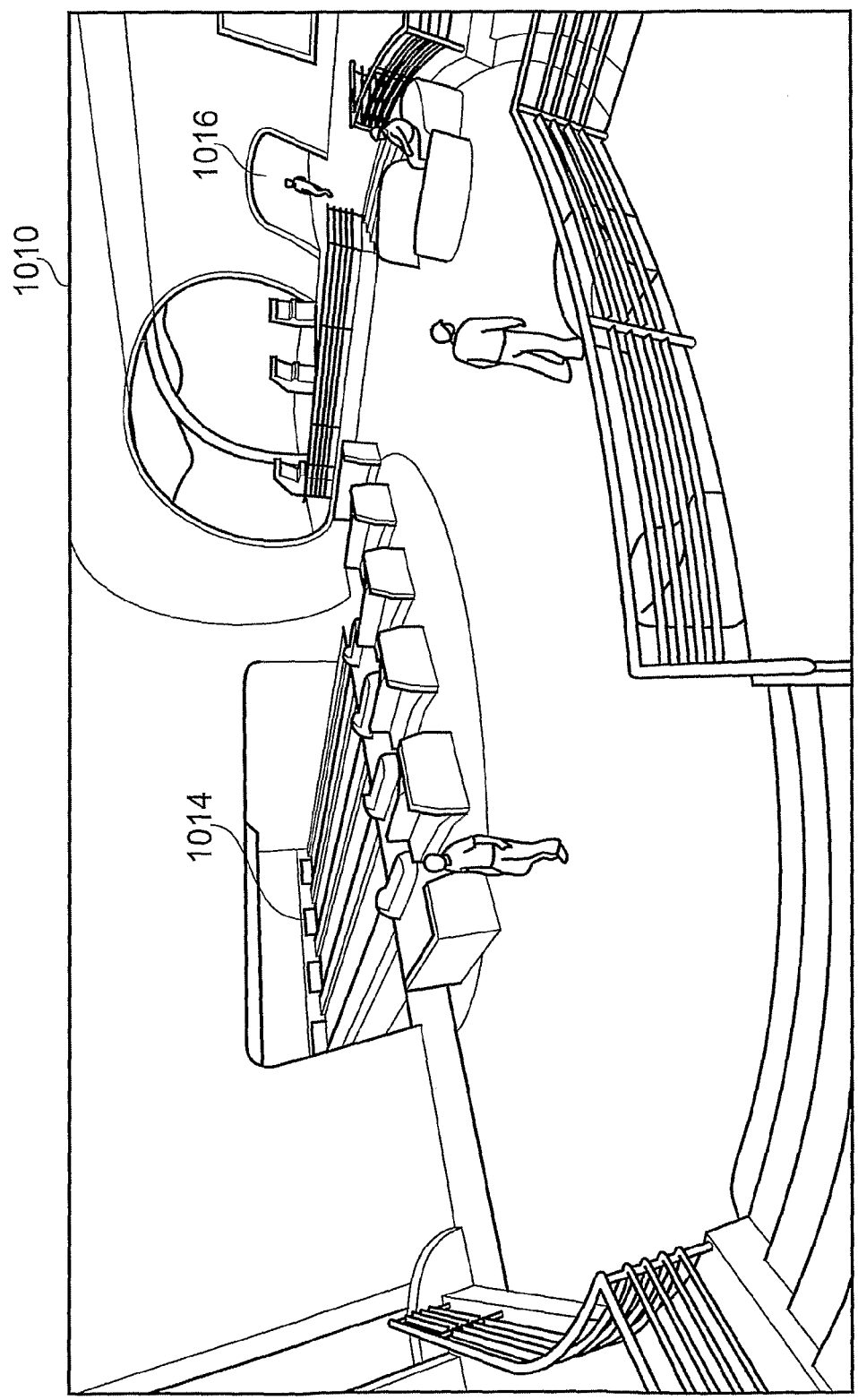
FIG. 6b is a schematic diagram of a lobby zone in accordance with an embodiment of the present invention.

Referring now also to FIG. 6b, the lobby zone 1010 may also include general amusements 1014, such as functioning pool tables, bowling alleys, and/or a video arcade. Games of pool or bowling may be conducted via the avatar, such that the avatar holds the pool cue or bowling ball, and is controlled in a conventional manner for such games. In the video arcade, if an avatar approaches a videogame machine, the home environment may switch to a substantially full-screen representation of the videogame selected. Such games may, for example, be classic arcade or console games such as Space Invaders®, or Pac-Man®, which are comparatively small in terms of memory and processing and can be emulated by the PS3 within the Home environment or run as plug-ins to the Home environment. In this case, typically the user will control the game directly, without representation by the avatar. The game will switch back to the default Home environment view if the user quits the game, or causes the avatar to move away from the videogame machine. In addition to classic arcade games, user-created game content may be featured on one or more of the virtual video game machines. Such content may be the subject of on-line competitions to be featured in such a manner, with new winning content downloaded on a regular basis.

In addition to the lobby zone 1010, other zones (e.g. zones 1020, 1030, 1040, 1050 and 1060, which may be rooms, areas or other constructs) are available. These may be accessed either via a map screen similar in nature to that of FIG. 4, or alternatively the user can walk to these other areas by guiding their avatar to various exits 1016 from the lobby.

Typically, an exit 1016 takes the form of a tunnel or corridor (but may equally take the form of an anteroom) to the next area. While the avatar is within the tunnel or anteroom, the next zone is loaded into memory. Both the lobby and the next zone contain identical models of the tunnel or anteroom, or the model is a common resource to both. In either case, the user's avatar is relocated from the lobby-based version to the new zone-based version of the tunnel or anteroom at the same position. In this way the user's avatar can apparently walk seamlessly throughout the Home environment, without the need to retain the whole environment in memory at the same time.

Figure 6C:
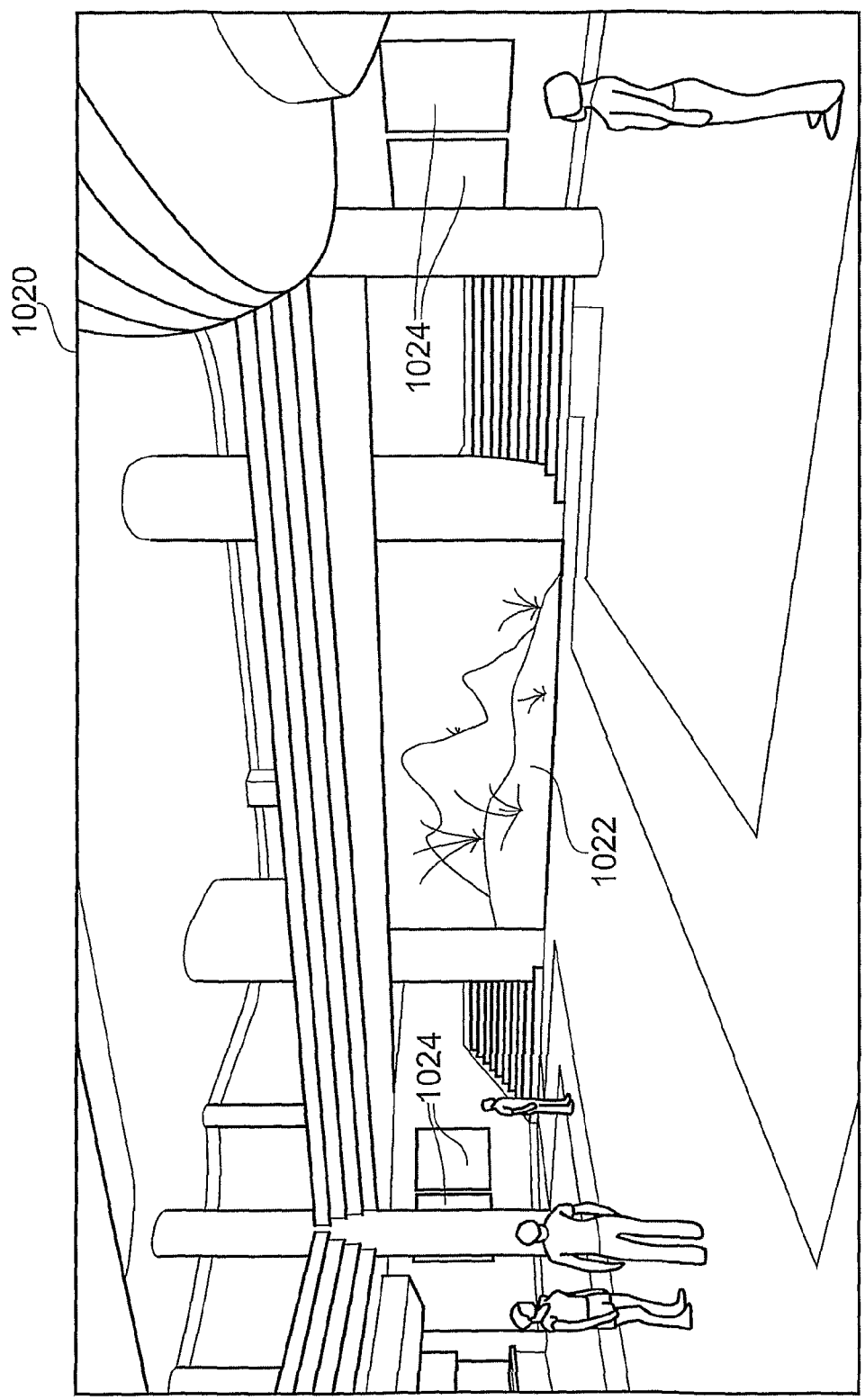
FIG. 6c is a schematic diagram of a cinema zone in accordance with an embodiment of the present invention.

Referring now also to FIG. 6c, one available zone is a Cinema zone 1020. The Cinema zone 1020 resembles a multiplex cinema, comprising a plurality of screens that may show content such as trailers, movies, TV programmes, or adverts downloaded or streamed from a Home environment server 2010 as noted previously and detailed below, or may show content stored on the HDD 400 or on an optical disk 440, such as a Blu-Ray disk.

Typically, the multiplex cinema will have an entrance area featuring a screen 1022 on which high-profile trailers and adverts may be shown to all visitors, together with poster adverts 1024, typically but not limited to featuring upcoming movies. Specific screens and the selection and display of the trailers and posters can each be restricted according to the age of the user, as registered with the PS3. This age restriction can be applied to any displayed content to which an age restriction tag is associated, in any of the zones within the Home environment.

In addition, in an embodiment of the present invention the multiplex cinema provides a number of screen rooms in which featured content is available, and amongst which the user can select. Within a screen room downloaded, streamed or locally stored media can be played within a virtual cinema environment, in which the screen is set in a room with rows of seats, screen curtains, etc. The cinema is potentially available to all users in the Home environment, and so the avatars of other users may also be visible, for example watching commonly streamed material such as a web broadcast. Alternatively, the user can zoom in so that the screen occupies the full viewing area.

Figure 6D:
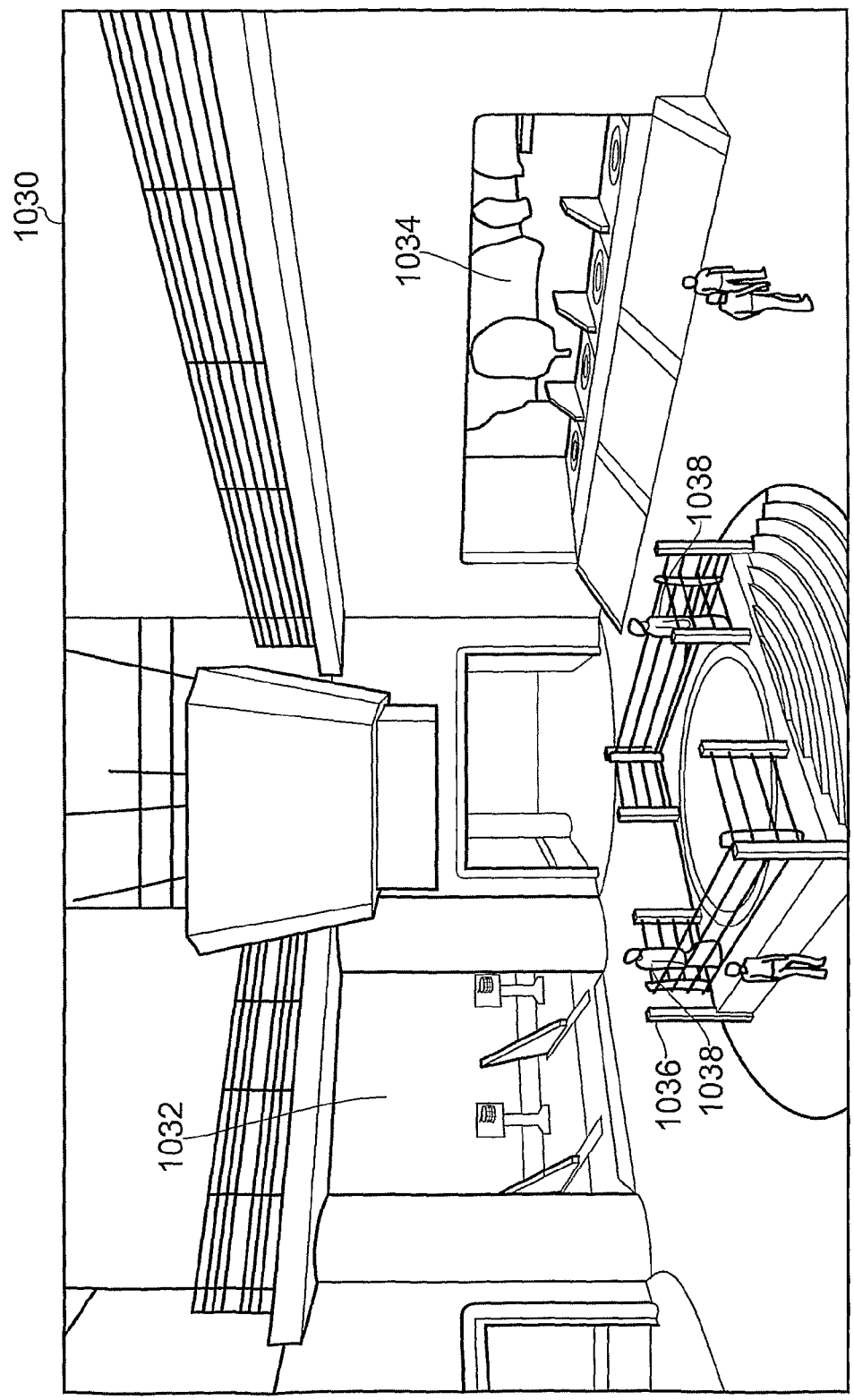
FIG. 6d is a schematic diagram of a developer/publisher zone in accordance with an embodiment of the present invention.

Referring now also to FIG. 6d, another type of zone is a developer or publisher zone 1030. Typically, there may be a plurality of such zones available. Optionally, each may have its own exit from the lobby area 1010, or alternatively some or all may share an exit from the lobby and then have separate exits from within a tunnel or ante-room model common to or replicated by each available zone therein. Alternatively they may be selected from a menu, either in the form of a pop-up menu, or from within the Home environment, such as by selecting from a set of signposts. In these latter cases the connecting tunnel or anteroom will appear to link only to the selected developer or publisher zone 1030. Alternatively or in addition, such zones may be selected via the map screen, resulting in the zone being loaded in to memory, and the avatar re-spawning within the selected zone.

Developer or publisher zones 1030 provide additional virtual environments, which may reflect the look and feel of the developer or publisher's products, brands and marks.

The developer or publisher zones 1030 are supplementary software modules to the Home environment and typically comprise additional 3D models and textures to provide the structure and appearance of the zone.

In addition, the software operable to implement the Home environment supports the integration of third party software via an application program interface (API). Therefore, developers can integrate their own functional content within the Home environment of their own zone. This may take the form of any or all of:

i. Downloading/streaming of specific content, such as game trailers or celebrity endorsements;
 ii. Changes in avatar appearance, behaviour and/or communication options within the zone;
 iii. The provision of one or more games, such as basketball 1032 or a golf range 1034, optionally branded or graphically reminiscent of the developer's or publisher's games;
 iv. One or more interactive scenes or vignettes representative of the developer's or publisher's games, enabling the player to experience an aspect of the game, hone a specific skill of the game, or familiarise themselves with the controls of a game;
 v. An arena, ring, dojo, court or similar area 1036 in which remotely played games may be represented live by avatars 1038, for spectators to watch.

Thus, for example, a developer's zone resembles a concourse in the developer's signature colours and featuring their logos, onto which open gaming areas, such as soccer nets, or a skeet range for shooting. In addition, a booth (not shown) manned by game-specific characters allows the user's avatar to enter and either temporarily change into the lead character of the game, or zoom into a first person perspective, and enter a further room resembling a scene from the featured game. Here the user interacts with other characters from the game, and plays out a key scene. Returning to the concourse, adverts for the game and other content are displayed on the walls. At the end of the zone, the concourse opens up into an arena where a 5-a-side football match is being played, where the positions of the players and the ball correspond to a game currently being played by a popular group, such as a high-ranking game clan, in another country.

In embodiments of the present invention, developer/publisher zones are available to download. Alternatively or in addition, to reduce bandwidth they may be supplied as demo content on magazine disks, or may be installed/upgraded from disk as part of the installation process for a purchased game of the developer or publisher. In the latter two examples, subsequent purchase or registration of the game may result in further zone content being unlocked or downloaded. In any event, further modifications, and timely advert and trailer media, may be downloaded as required.

A similar zone is the commercial zone 1040. Again, there may be a plurality of such commercial zones accessible in similar manner to the developer and publisher zones. Like developer/publisher zones 1030, Commercial zones 1040 may comprise representative virtual assets of one or more commercial vendors in the form of 3D models, textures etc., enabling a rendering of their real-world shops, brands and identities, and these may be geographically and/or thematically grouped within zones.

Space within commercial zones may be rented as so-called 'virtual real-estate' by third parties. For example, a retailer may pay to have a rendering of their shop included within a commercial zone 1040 as part of a periodic update of the Home environment supplied via the Home environment server 2010, for example on a monthly or annual renewal basis. A retailer may additionally pay for the commerce facilities described above, either on a periodic basis or per item. In this way they can provide users of the Home environment with a commercial presence.

Again, the commercial zone comprises supplementary software that can integrate with the home environment via an API, to provide additional communication options (shop-specific names, goods, transaction options etc), and additional functionality, such as accessing an online database of goods and services for purchase, determining current prices, the availability of goods, and delivery options. Such functions may be accessed either via a menu (either as a pop-up or within the Home environment, for example on a wall) or via communication with automated avatars. Communication between avatars is described in more detail later.

It will be appreciated that developers and publishers can also provide stores within commercial zones, and in addition that connecting tunnels between developer/publisher and commercial zones may be provided. For example, a tunnel may link a developer zone to a store that sells the developer's games. Such a tunnel may be of a 'many to one' variety, such that exits from several zones emerge from the same tunnel in-store. In this case, if re-used, typically the tunnel would be arranged to return the user to the previous zone rather than one of the possible others.

In an embodiment of the present invention, the software implementing the Home environment has access to an online-content purchase system provided by the PS3 OS. Developers, publishers and store owners can use this system via an interface to specify the IP address and query text that facilitates their own on-line transaction. Alternatively, the user can allow their PS3 registration details and credit card details to be used directly, such that by selecting a suitably enabled object, game, advert, trailer or movie anywhere within the Home environment, they can select to purchase that item or service. In particular, the Home environment server 2010 can store and optionally validate the user's credit card and other details so that the details are ready to be used in a transaction without the user having to enter them. In this way the Home environment acts as an intermediary in the transaction. Alternatively such details can be stored at the PS3 and validated either by the PS3 or by the Home environment server.

Figure 7:
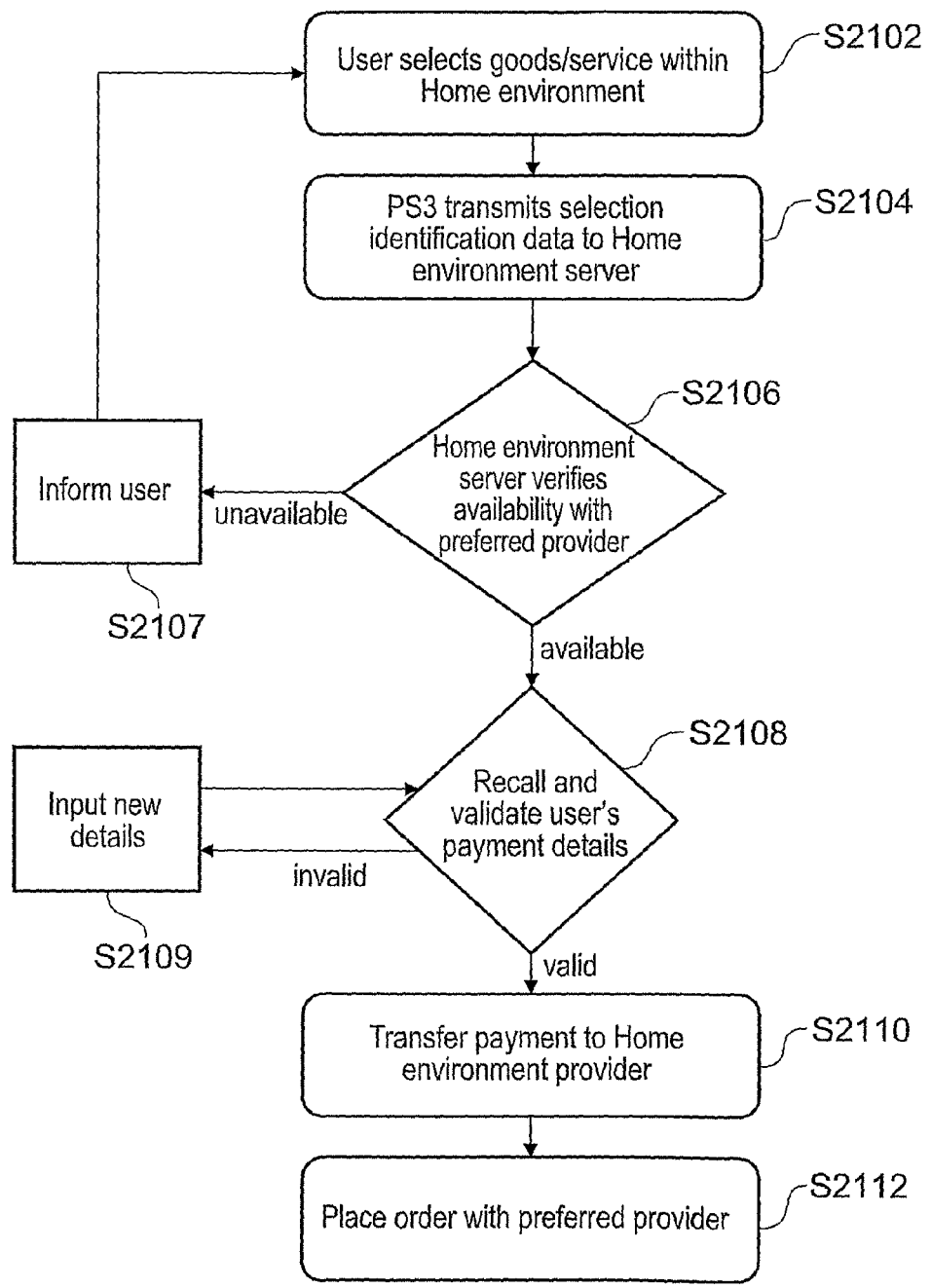
FIG. 7 is a flow diagram of a method of on-line transaction in accordance with an embodiment of the present invention.

Thus, referring now also to FIG. 7, in an embodiment of the present invention a method of sale comprises in a step s2102 a user selecting an item (goods or a service) within the Home environment. In step s2104, the PS3 10 transmits identification data corresponding with the object to the Home environment server 2010, which in step s2016 verifies the item's availability from a preferred provider (preferably within the country corresponding to the IP address of the user). If the item is unavailable then in step s2107 it informs the user by transmitting a message to the user's PS3 10. Alternatively, it first checks for availability from one or more secondary providers, and optionally confirms whether supply from one of these providers is acceptable to the user. In step s2108, the Home environment server retrieves from data storage the user's registered payment details and validates them. If there is no valid payment method available, then the Home environment may request that the user enters new details via a secure (i.e. encrypted) connection. Once a valid payment method is available, then in step s2110 the Home environment server requests from the appropriate third part payment provider a transfer of payment from the user's account. Finally, in s2112 the Home environment server places an order for the item with the preferred provider, giving the user's delivery address or IP address as applicable, and transferring appropriate payment to the preferred provider's account.

In this way, commerce is not limited specifically to shops. Similarly, it is not necessary for shops to provide their own commerce applications if the preferred provider for goods or services when displayed within a shop is set to be that shop's owner. Where the goods or service may be digitally provided, then optionally it is downloaded from the preferred provider directly or via a Home environment server 2010.

In addition to the above public zones, there are additional zones that are private to the individual user and may only be accessed by them or by invitation from them. These zones also have exits from the communal lobby area, but when entered by the avatar (or chosen via the map screen), load a respective version of the zone that is private to that user.

Figure 8A:
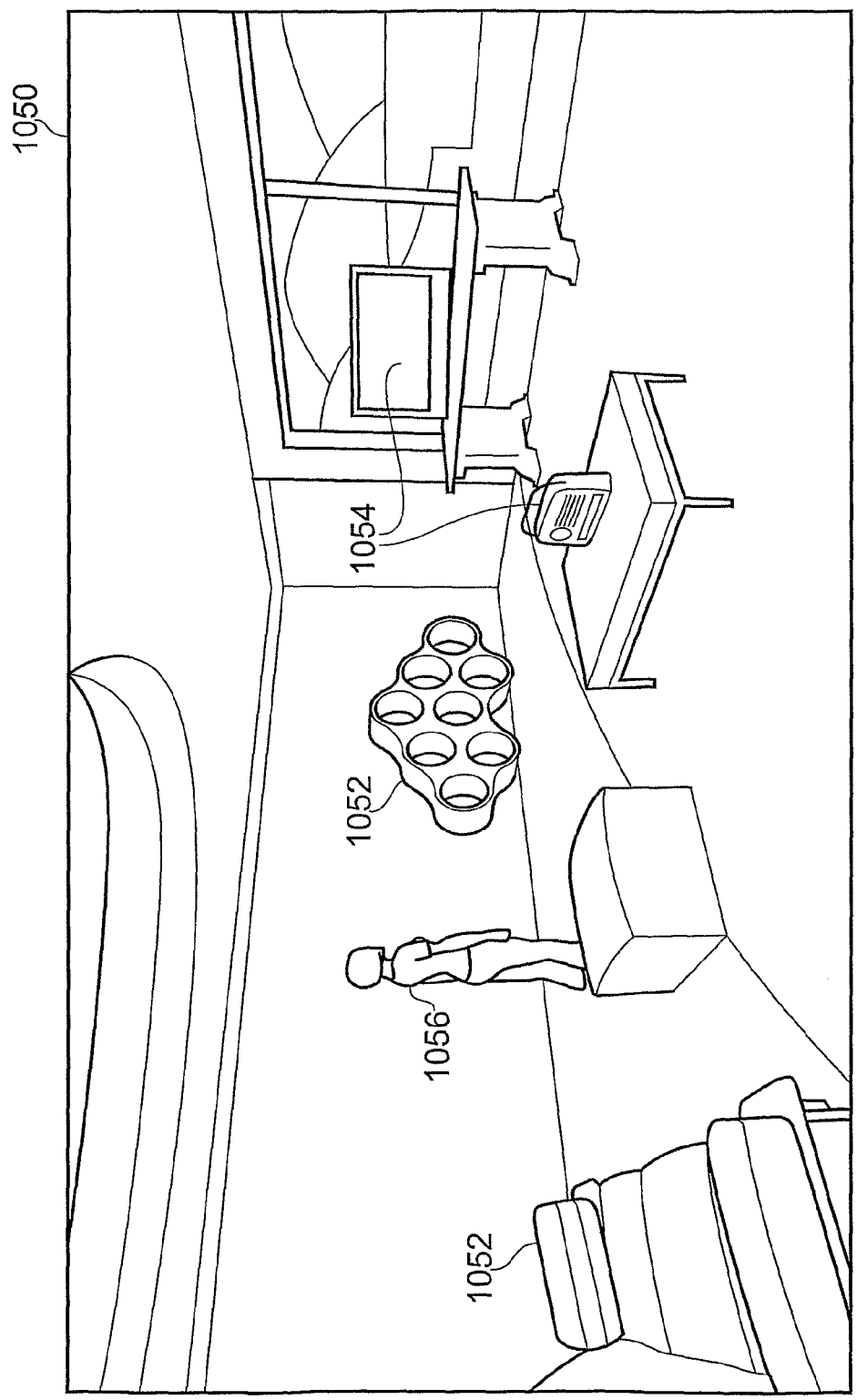
FIG. 8a is schematic diagram of an apartment zone in accordance with an embodiment of the present invention.

Referring to FIG. 8*a*, the first of these zones is an apartment zone 1050. In an embodiment of the present invention, this is a user-customisable zone in which such features 1052 as wallpaper, flooring, pictures, furniture, outside scenery and lighting may be selected and positioned. Some of the furniture is functional furniture 1054, linked to PS3 functionality. For example, a television may be placed in the apartment 1050 on which can be viewed one of several streamed video broadcasts, or media stored on the PS3 HDD 400 or optical disk 440. Similarly, a radio or hi-fi may be selected that contains pre-selected links to internet radio streams. In addition, user artwork or photos may be imported into the room in the form of wall hangings and pictures.

Optionally, the user (represented in FIG. 8*a* by their avatar 1056) may purchase a larger apartment, and/or additional goods such as a larger TV, a pool table, or automated non-player avatars. Other possible items include a gym, swimming pool, or disco area. In these latter cases, additional control software or configuration libraries to provide additional character functionality will integrate with the home environment via the API in a similar fashion to that described for the commercial and developer/publisher zones 1030, 1040 described previously.

Such purchases may be made using credit card details registered with the Home environment server. In return for a payment, the server downloads an authorisation key to unlock the relevant item for use within the user's apartment. Alternatively, the 3D model, textures and any software associated with an item may also be downloaded from the Home environment server or an authorised third-party server, optionally again associated with an authorisation key. The key may, for example, require correspondence with a firmware digital serial number of the PS3 10, thereby preventing unauthorised distribution.

A user's apartment can only be accessed by others upon invitation from the respective user. This invitation can take the form of a standing invitation for particular friends from within a friends list, or in the form of a single-session pass conferred on another user, and only valid whilst that user remains in the current Home environment session. Such invitations may take the form of an association maintained by a Home environment server 2010, or a digital key supplied between PS3 devices on a peer-to-peer basis that enables confirmation of status as an invitee.

In an embodiment of the present invention invited users can only enter the apartment when the apartment's user is present within the apartment, and are automatically returned to the lobby if the apartment's user leaves. Whilst within the apartment, all communication between the parties present (both user and positional data) is purely peer-to-peer.

The apartment thus also provides a user with the opportunity to share home created content such as artwork, slideshows, audio or video with invited guests, and also to interact with friends without potential interference from other users within the public zones.

When invited guests enter a user's apartment, the configuration of the room and the furnishings within it are transmitted in a peer-to-peer fashion between the attendees using ID codes for each object and positional data. Where a room or item are not held in common between the user and a guest, the model, textures and any code required to implement it on the guest's PS3 may also be transmitted, together with a single-use key or similar constraint, such as use only whilst in the user's apartment and whilst the user and guest remain online in this session. Such ID codes may also be used when purchasing virtual goods as described above.

Figure 8B:
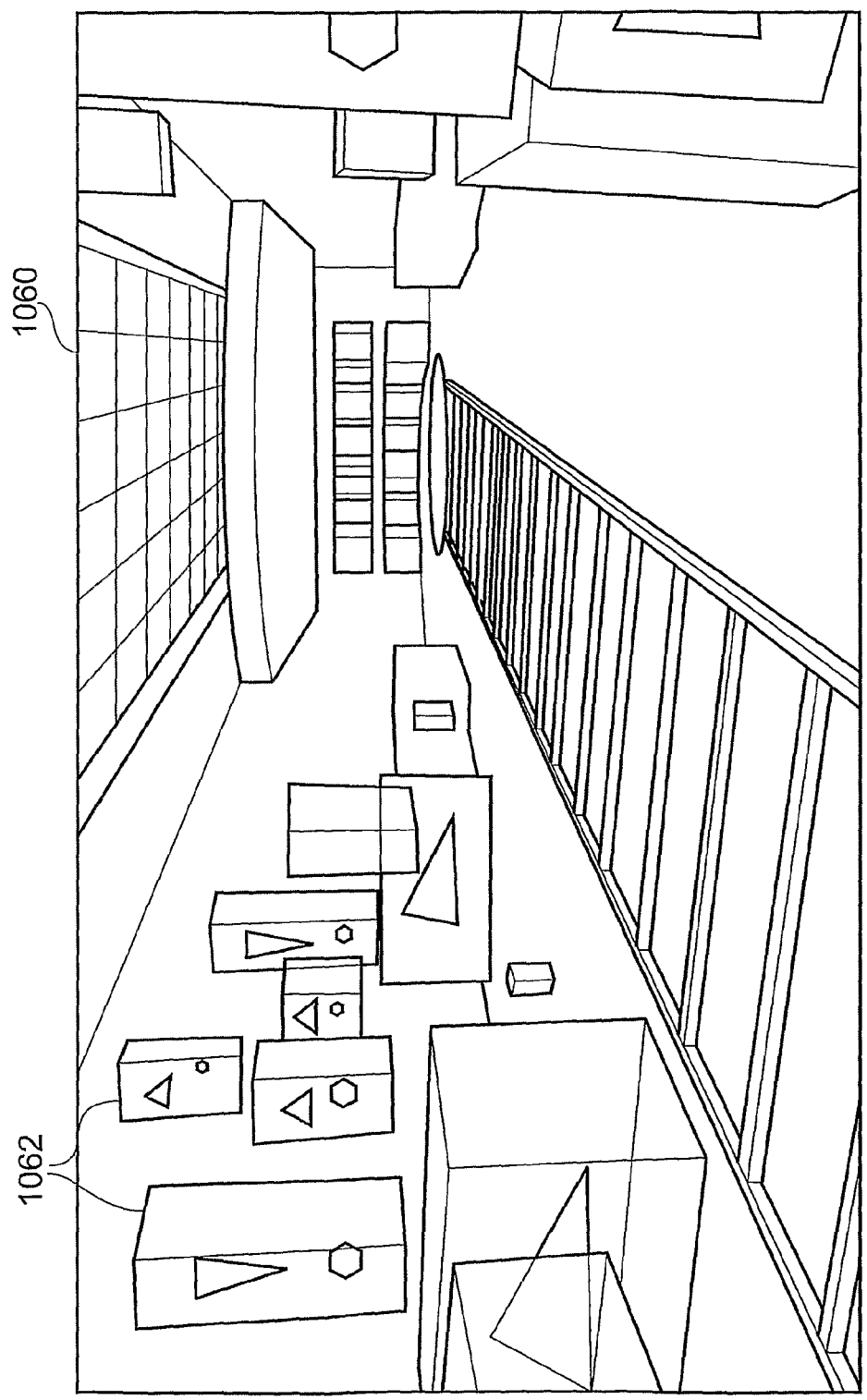
FIG. 8b is schematic diagram of a trophy room zone in accordance with an embodiment of the present invention.

Referring to FIG. 8*b*, a further private space that may similarly be accessed only by invitation is the user's Trophy Room 1060. The Trophy Room 1060 provides a space within which trophies 1062 earned during game play may be displayed.

For example, a third-party game comprises seeking a magical crystal. If the player succeeds in finding the crystal, the third party game nominates this for the Trophy Room 1060, and places a 3D model and texture representative of the crystal in a file area accessed by the Home environment software when loading the Trophy Room 1060. The software implementing the Home environment can then render the crystal as a trophy within the Trophy Room.

When parties are invited to view a user's trophy room, the models and textures required to temporarily view the trophies are sent from the user's PS3 to those of the other parties on a peer-to-peer basis. This may be done as a background activity following the initial invitation, in anticipation of entering the trophy room, or may occur when parties enter a connecting tunnel/anteroom or select the user's trophy room from the map screen. Optionally, where another party also has that trophy, they will not download the corresponding trophy from the user they are visiting. Therefore, in an embodiment of the present invention, each trophy comprises an identifying code.

Alternatively or in addition, a trophy room may be shared between members of a group or so-called 'clan', such that a trophy won by any member of the clan is transmitted to other members of the clan on a peer-to-peer basis. Therefore all members of the clan will see a common set of trophies.

Alternatively or in addition, a user can have a standing invitation to all members of the Home environment, allowing anyone to visit their trophy room. As with the commercial and developer/publisher zones, a plurality of rooms is therefore possible, for example a private, a group-based and a public trophy room. This may be managed either by selection from a pop-up menu or signposts within the Home environment as described previously, or by identifying relevant user by walking up to their avatar, and then selecting to enter their (public) trophy room upon using the trophy room exit from the lobby.

Alternatively or in addition, a public trophy room may be provided. This room may display the trophies of the person in the current instance of the Home environment who has the most trophies or a best overall score according to a trophy value scoring scheme. Alternatively it may be an aggregate trophy room, showing the best, or a selection of, trophies from some or all of the users in that instance of the Home environment, together with the ID of the user. Thus, for example, a user could spot a trophy from a game they are having difficulty with, identify who in the Home environment won it, and then go and talk to them about how they won it. Alternatively, a public trophy room could contain the best trophies across a plurality of Home environments, identifying the best garners within a geographical, age specific or game specific group, or even world wide. Alternatively or in addition, a leader board of the best scoring garners can be provided and updated live.

It will be appreciated that potentially a large number of additional third party zones may become available, each comprising additional 3D models, textures and control software. As a result a significant amount of space on HDD 400 may become occupied by Home environment zones.

Consequently, in an embodiment of the present invention the number of third party zones currently associated with a user's Home environment can be limited. In a first instance, a maximum memory allocation can be used to prevent additional third party zones being added until an existing one is deleted. Alternatively or in addition, third party zones may be limited according to geographical relevance or user interests (declared on registration or subsequently via an interface with the Home environment server 2010), such that only third party zones relevant to the user by these criteria are downloaded. Under such a system, if a new third party zone becomes available, its relevance to the user is evaluated according to the above criteria, and if it is more relevant than at least one of those currently stored, it replaces the currently least relevant third party zone stored on the user's PS3.

Other criteria for relevance may include interests or installed zones of nominated friends, or the relevance of zones to games or other media that have been played on the user's PS3.

Further zones may be admitted according to whether the user explicitly installs them, either by download or by disk.

As noted above, within the Home environment users are represented by avatars. The software implementing the Home environment enables the customisation of a user's avatar from a selection of pre-set options in a similar manner to the customisation of the user's apartment. The user may select gender and skin tone, and customise the facial features and hair by combining available options for each. The user may also select from a wide range of clothing. To support this facility, a wide range of 3D models and textures for avatars are provided. In an embodiment of the present invention, user may import their own textures to display on their clothing. Typically, the parameters defining the appearance of each avatar only occupy around 40 bytes, enabling fast distribution via the home server when joining a populated Home environment.

Each avatar in the home environment can be identified by the user's ID or nickname, displayed in a bubble above the avatar. To limit the proliferation of bubbles, these fade into view when the avatar is close enough that the text it contains could easily be read, or alternatively when the avatar is close enough to interact with and/or is close to the centre of the user's viewpoint.

The avatar is controlled by the user in a conventional third-person gaming manner (e.g. using the game controller 751), allowing them to walk around the Home environment. Some avatar behaviour is contextual; thus for example the option to sit down will only be available when the avatar is close to a seat. Other avatar behaviour is available at all times, such as for example the expression of a selected emotion or gesture, or certain communication options. Avatar actions are determined by use of the game controller 751, either directly for actions such as movement, or by the selection of actions via a pop-up menu, summoned by pressing an appropriate key on the game controller 751.

Options available via such a menu include further modification of the avatar's appearance and clothing, and the selection of emotions, gestures and movements. For example, the user can select that their avatar smiles, waves and jumps up and down when the user sees someone they know in the Home environment.

Users can also communicate with each other via their avatars using text or speech.

To communicate by text, in an embodiment of the present invention, messages appear in pop-up bubbles above the relevant avatar, replacing their name bubble if necessary.

Figure 9:
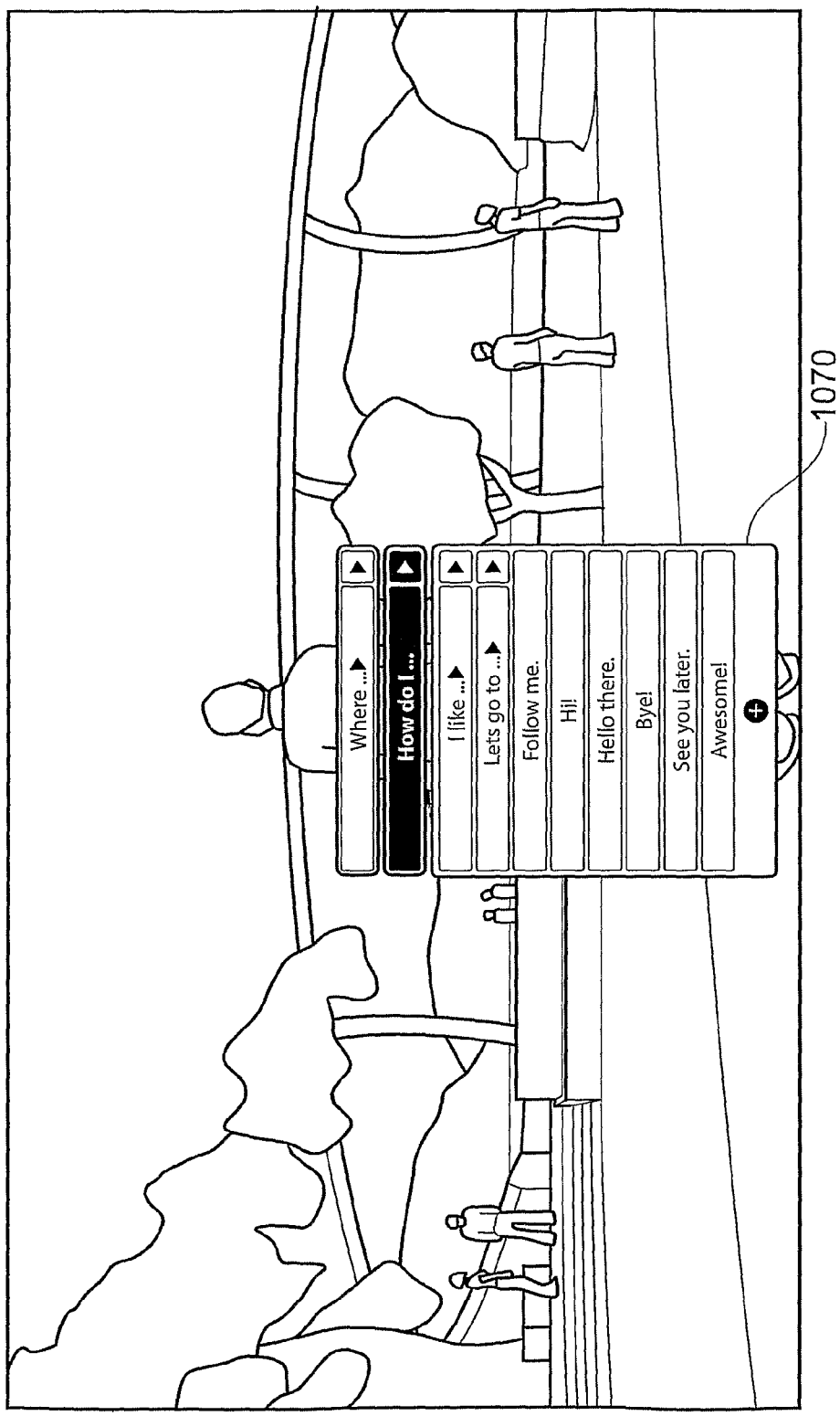
FIG. 9 is a schematic diagram of a communication menu in accordance with an embodiment of the present invention.

Referring now also to FIG. 9, to generate a message the user can activate a pop-up menu 1070 in which a range of preset messages is provided. These may be complete messages, or alternatively or in addition may take the form of nested menus, the navigation of which generates a message by concatenating selected options.

Alternatively or in addition, a virtual keyboard may be displayed, allowing free generation of text by navigation with the game controller 751. If a real keyboard 753 is connected via Bluetooth, then text may by typed into a bubble directly.

In an embodiment of the present invention, the lobby also provides a chat channel hosted by the Home environment server, enabling conventional chat facilities.

To communicate by speech, a user must have a microphone, such as a Bluetooth headset 757, available. Then in an embodiment of the present invention, either by selection of a speech option by pressing a button on the game controller 751, or by use of a voice activity detector within the software implementing the Home environment, the user can speak within the Home environment. When speaking, a speech icon may appear above the head of the avatar for example to alert other users to adjust volume settings if necessary.

The speech is sampled by the user's PS3, encoded using a Code Excited Linear Prediction (CELP) codec (or other known VoIP applicable codec), and transmitted in a peer-to-peer fashion to the eight nearest avatars (optionally provided they are within a preset area within the virtual environment surrounding the user's avatar). Where more than eight other avatars are within the preset area, one or more of the PS3s that received the speech may forward it to other PS3s having respective user avatars within the area that did not receive the speech, in an ad-hoc manner. To co-ordinate this function, in an embodiment of the present invention the PS3 will transmit a speech flag to all PS3s whose avatars are within the present area, enabling them to place a speech icon above the relevant (speaking) avatars head (enabling their user to identify the speaker more easily) and also to notify the PS3s of a transmission. Each PS3 can determine from the relative positions of the avatars which ones will not receive the speech, and can elect to forward the speech to the PS3 of whichever avatar they are closest to within the virtual environment. Alternatively, the PS3s within the area can ping each other, and whichever PS3 has the lowest lag with a PS3 that has not received the speech can elect to forward it.

It will be appreciated that the limitation to eight is exemplary, and the actual number depends upon such factors as the speech compression ratio and the available bandwidth.

In an embodiment of the present invention, such speech can also be relayed to other networks, such as a mobile telephony network, upon specification of a mobile phone number. This may be achieved either by routing the speech via the Home environment server to a gateway server of the mobile network, or by Bluetooth transmission to the user's own mobile phone. In this latter case, the mobile phone may require middleware (e.g. a Java® applet) to interface with the PS3 and route the call.

Thus a user can contact a person on their phone from within the Home environment. In a similar manner, the user can also send a text message to a person on their mobile phone.

In a similar manner to speech, in an embodiment of the present invention users whose PS3s are equipped with a video camera such as the Sony® Eye Toy® video camera can use a video chat mode, for example via a pop-up screen, or via a TV or similar device within the Home environment, such as a Sony® Playstation Portable® (PSP) held by the avatar. In this case video codecs are used in addition to or instead of the audio codecs.

Optionally, the avatars of users with whom you have spoken recently can be highlighted, and those with whom you have spoken most may be highlighted more prominently, for example by an icon next to their name, or a level of glow around their avatar.

Referring back to FIG. 5, when a user selects to activate the Home environment on their PS3 10, the locally stored software generates the graphical representation of the Home environment, and connects to a Home environment server 2010 that assigns the user to one of a plurality of online Home environments 2021, 2022, 2023, 2024. Only four home environments are shown for clarity.

It will be understood that potentially many tens of thousands of users may be online at any one time. Consequently to prevent overcrowding, the Home environment server 2010 will support a large plurality of separate online Home environments. Likewise, there may be many separate Home environment servers, for example in different countries.

Once assigned to an instance of a Home environment, a PS3 initially uploads information regarding the appearance of the avatar, and then in an ongoing fashion provides to the Home environment server with positional data for its own avatar, and receives from the Home environment server the positional data of the other avatars within that online Home environment. In practice this positional update is periodic (for example every 2 seconds) to limit bandwidth, so other PS3s must interpolate movement. Such interpolation of character movement is well-known in on-line games. In addition, each update can provide a series of positions, improving the replication of movement (with some lag), or improving the extrapolation of current movement.

In addition the IP addresses of the other PS3s 2131, 2032, 2033 within that Home environment 2024 is shared so that they can transmit other data such as speech in a peer-to-peer fashion between themselves, thereby reducing the required bandwidth of data handled by the Home entertainment server.

To prevent overcrowding within the Home environments, each will support a maximum of, for example, 64 users.

The selection of a Home environment to which a user will be connected can take account of a number of factors, either supplied by the PS3 and/or known to the Home environment server via a registration process. These include but are not limited to:

i. The geographical location of the PS3;
  ii. The user's preferred language;
  iii. The user's age;
  iv. Whether any users within the current user's 'friends list' are in a particular Home environment already;
  v. What game disk is currently within the user's PS3;
  vi. What games have recently been played on the user's PS3.

Thus, for example, a Swiss teenager may be connected to a Home environment on a Swiss server, with a maximum user age of 16 and a predominant language of French. In another example, a user with a copy of 'Revolution' mounted in their PS3 may be connected to a home environment where a predominant number of other users also currently have the same game mounted, thereby facilitating the organisation of multiplayer games. In this latter case, the PS3 10 detects the game loaded within the BD-Rom 430 and informs the Home environment server 2010. The server then chooses a Home environment accordingly.

In a further example, a user is connected to a Home environment in which three users identified on his friends list can be found. In this latter example, the friends list is a list of user names and optionally IP addresses that have been received from other users that the user given wishes to meet regularly. Where different groups of friends are located on different Home environment servers (e.g. where the current user is the only friend common to both sets) then the user may either be connected to the one with the most friends, or given the option to choose.

Conversely, a user may invite one or more friends to switch between Home environments and join them. In this case, the user can view their friends list via a pop-up menu or from within the Home environment (for example via a screen on the wall or an information booth) and determine who is online. The user may then broadcast an invite to their friends, either using a peer-to-peer connection or, if the friend is within a Home environment or the IP address is unknown, via the Home environment server. The friend can then accept or decline the invitation to join.

To facilitate invitation, generally a Home environment server will assign less than the maximum supported number of users to a specific home environment, thereby allowing such additional user-initiated assignments to occur. This so-called 'soft-limit' may, for example, be 90% of capacity, and may be adaptive, for example changing in the early evening or at weekends where people are more likely to meet up with friends on-line.

Where several friends are within the same Home environment, in an embodiment of the present invention the map screen may also highlight those zones in which the friends can currently be found, either by displaying their name on the map or in association with the zone name on the side bar.

Figure 10:
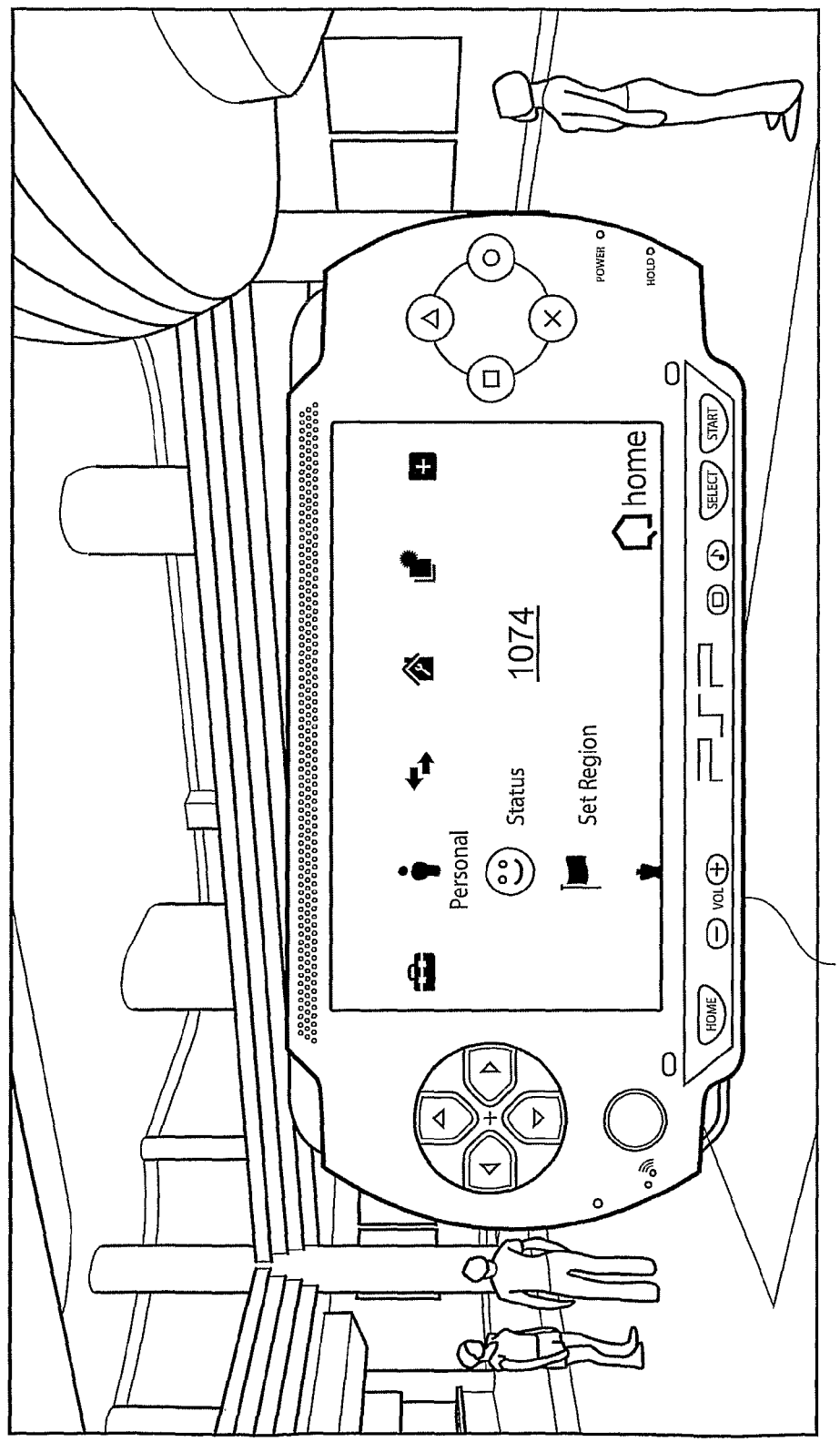
FIG. 10 is a schematic diagram of an interactive virtual user device in accordance with an embodiment of the present invention.

Referring now also to FIG. 10, in addition, preferences, settings, functions of the Home environment and optionally other functionality may be viewed, adjusted or accessed as appropriate by use of a virtual Sony® Playstation Portable (PSP) entertainment device 1072 that can be summoned by use of the game controller 751 to pop-up on screen. The user can then access these options, settings and functionality via a PSP cross-media bar 1074 displayed on the virtual PSP. As noted above, the PSP could also be used as an interface for video chat.

When a user wishes to leave the Home environment, in embodiments of the present invention they may do so by selection of an appropriate key on the game controller 751, by selection of an exit option from a pop-up menu, by selection of an exit from within the map screen, by selection of an option via their virtual PSP or by walking through a master exit within the lobby zone.

Typically, exiting the Home environment will cause the PS3 10 to return to the PS3 cross media bar.

Finally, it will be appreciated that additional, separate environments based upon the Home environment software and separately accessible from the PS3 cross-media bar are envisaged. For example, a supermarket may provide a free disk upon which a Supermarket environment, supported in similar fashion by the Home environment servers, is provided. Upon selection, the user's avatar can browse displayed goods within a virtual rendition of the supermarket (either as 3D models or textures applied to shelves) and click on them to purchase as described above. In this way retailers can provide and update online shopping facilities for their own user base.

Figure 11:
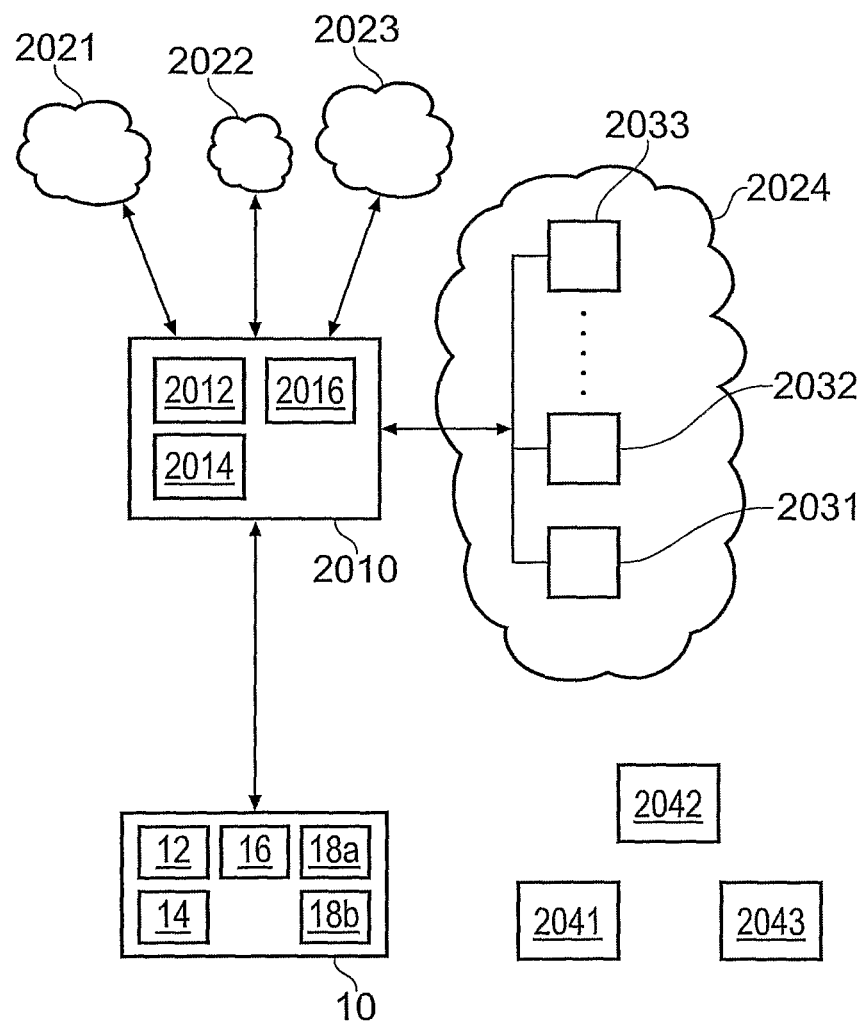
FIG. 11 is a schematic diagram of a Home environment online client/server arrangement in accordance with an embodiment of the present invention.

FIG. 11 is a schematic diagram of a Home environment system in accordance with an embodiment of the present invention. Features in common with those of FIG. 5 are labelled the same. As described previously, a user's PS3 10 connects to a Home environment server 2010 which assigns the user to a particular instance of the Home environment 2024, in which can be found the avatars of other users 2031, 2032, 2033. The user of the PS3 then communicates with the other users via their avatars, with the PS3s using a mixture of data shared via the Home environment server (such as positional data) and peer-to-peer (such as text or speech communication).

In an embodiment of the present invention, users within the Home environment can form groups, with the intent of joining a separate on line game (such as, for example Counterstrike® Source or Resistance: Fall of Man®) together as a group.

To this end, in an embodiment of the present invention, the PS3 comprises one or more field programmable gate arrays (FPGAs), application specific integrated circuits (ASICs) and/or software applications, comprising a group membership selection means 12, a server evaluation means 14 and a server selection means 16. In addition, the PS3 comprises a game 18a and a server selection data retrieval means 18b. The operation of these means is described below.

A group may be automatically determined by a group membership selection means 12 of the PS3 when two or more avatars are within a threshold distance of each other, or of another member of the determined group. For example if two people stand within a threshold distance of each other, a circle can appear around them on the floor of the Home environment defining an inclusion zone with a perimeter at least a threshold distance from the parties within it. If a third person (i.e., their avatar) enters this zone, it expands to include them, and so on. Optionally this facility is activated by the user when they are looking for groups, or only becomes active within certain reserved areas of the Home environment (for example a 'departure lounge' zone, by analogy with an airport where groups are organised together to depart to another destination).

Alternatively or in addition, one or more zones of the Home environment may include specific areas (notionally equivalent to 'departure gates', to continue the airport analogy). By standing in such an area, the user automatically becomes a member of the group of users that are also standing there, if any are. Such an area can optionally contain its own amusements, such as pool tables, arcade machines etc.

Optionally, these amusements can be themed or representative of the game to which the departure gate relates. Details of this facility are described later.

Such location based determination of groups can further comprise automatic contention mechanisms; where, for example, three out of four members of a group have the disk for Resistance mounted within their PS3, the group can automatically become a Resistance playing group. This may be signified by a text bubble above the group, or an icon representing the game placed on the perimeter of the group. Alternatively, it may be signified by modification of the user's avatars to resemble a character from the relevant game, the data to configure the avatars either being available from the game disk or from the Home environment server, and transmitted to other members of that instance of the Home environment.

Where a specific area or departure gate is set aside as described above, this may be unassigned and subject to contention as described above, or may be specific to a particular game. For example, a developer's zone may provide a departure gate specific to one of its own games.

Alternatively or in addition, such groups can be nominated via a pop-up interface within the home environment. For example, a user could start a group called 'Counterstrike—Newbies', (where "Newbies" is a gaming slang term for inexperienced players) and other users within that instance of the Home environment can peruse nominated groups via their own interface, and select to join it.

Groups can be further sub-divided by the user's skill level or age, or by game-specific preferences such as difficulty level, preferred game map, or settings such as gore level (i.e. levels of blood or injury details, or alternative graphical representations such as non-human opponents for example for certain games players).

In one embodiment of the present invention, some or all of the above group determination strategies are conducted by the PS3s of users within an instance of the Home environment. In another embodiment, some or all of such group determination strategies are conducted by the Home environment server (comprising suitably corresponding group determination means 2012) which, for example, can evaluate relative and absolute positions of avatars within the Home environment for this purpose, and can maintain default and user nominated groups.

In the latter case of nominated groups, the Home environment server need not be limited to a single specific instance of the Home environment. Thus, for example, a user in a first instance of the Home environment could then peruse and join nominated groups created by a user in a second instance of the Home environment. Optionally, upon joining, the user could be transferred to that second instance of the Home environment near to members of the nominated group. To limit the number of possible nominated groups seen by a user, these may be filtered by the Home environment server according to mounted game disk, geographical location, language and other bases for sub-division described above until a manageable number of groups is made available to the user.

In an embodiment of the present invention, avatars corresponding to members of a group are visually differentiated from other avatars, for example by having a specific colour 'glow' around them, or changing an item of clothing to a common item (for example bearing the game logo and/or a team name), or changing the avatar to resemble a character from the game itself. In this latter example, character models and textures may be accessed from the game disk or installation data on the PS3 HDD 400, or may be downloaded from the Home environment server 2010. It is optional whether the character models and textures are passed to other users so that they can also see the in-game characters. Thus, for example, non-group members may only see a colour coding whilst group members see characters from within the game.

Other indicators may also be used, such as indicators of skill, either self asserted or determined from game data, enabling people to pick groups suited to their own level. As noted previously, optionally a user can elect to spawn to an instance of the Home environment heavily populated with players of the game they currently have mounted in their PS3. This can optionally be further refined to an instance with players of similar skill level within that game.

Once a group has been established, a server evaluation means 14 evaluates gaming options available to the group. In an embodiment of the present invention, each PS3 obtains a master list of game servers 2041, 2042, 2043, registered to host the game with which the group is associated (either by explicit selection or the above contention process). It will be appreciated that considerably more than the three illustrated servers may be available. This master list may be acquired when the user's PS3 initially connects the Home environment server, and may either comprise data for all supported games, or just for the game whose disk is currently mounted in the PS3. Alternatively the list may be downloaded upon entry to a group, and may again either contain game server data for all games or just for the game associated with the group. The list may be further limited by geographical location or other criteria (for example a locked server available to only certain users will only appear to those certain users).

Each PS3 attempts to contact a plurality of the game servers on the list (typically all of them), in a process commonly known as 'pinging' the server. The ping is the round-trip time in milliseconds between transmitting the ping request and receiving an acknowledgement from the server.

Optionally, the game server can also send information regarding the game or games it is hosting, including their availability; many online games have a limited capacity, such as 16 or 32 players, and so may have limited available space at any given moment.

The PS3s collate their ping data and optionally the availability data. Game servers are ranked in order of lowest aggregate ping (either in total or averaged), thereby providing potentially the fastest game for the group overall. Where availability data is provided, servers with insufficient availability to host the group can be excluded. Ping data can start to be collated as it arrives; there is no need to wait for acknowledgement from all the servers (indeed, this is unlikely).

Preferably, the top-ranking game server is then selected for the group by the server selection means 16.

The evaluation process can be repeated whenever membership of the group changes, or periodically. Alternatively or in addition, the server evaluation means can prompt or force a change of group membership by evaluating whether removal of a given member of the group would allow reorder the rankings and result in selection of a different game server with a lower ping for the remaining members of the group. This may occur for example where one or more members of the groups have a particularly bad connection, or are in fact geographically distant from other members of the group, and have correspondingly worse ping values for the top ranking game server.

Identification of such members may be based on absolute difference in ping value from the mean ping value, or deviation above a threshold variance from the mean ping value. Alternatively the member with the slowest ping may be momentarily discounted as a matter of course to determine whether the rankings change.

Optionally, any game servers now potentially able to host the smaller group according to their availability data may be reintroduced into the rankings for this purpose.

In any event, optionally a member is not prompted or forced to leave the group unless the change in rankings results in a new top game server whose aggregate ping is smaller than the last top game server's aggregate ping by a threshold amount. The thresholds for prompting and forcing can be different.

Where a member does not have a game server master list, or cannot share their ping data (for example due to poor or intermittent connectivity) they are not included in the evaluation, and are optionally prompted to leave.

It will be appreciated that other aspects of connection between a PS3 and a game server may be used instead of or as well as ping, including one-way connection speed, signal strength, bit error rate, and data bandwidth. Where two or more aspects of connection are used in the evaluation process, they may be weighted according to empirically determined weighting factors.

Where the member PS3 s successfully share their connection information with each other, the server evaluation means of each respective PS3 in the group will, as a matter of course, generate a convergent ranking as the ping results come in. However, optionally to ensure this ranking is consistent across all members of the group, the top P ranked game servers can be compared between the server evaluation means of the group members, with minority decisions for each ranking position being overridden. Alternatively, optionally only one member of the group may perform the full evaluation and then share the ranking result (or final selection) with members of the group. This member may belong to the user who nominated the group, or correspond to some group criterion such as having the avatar closest to the centre of the group within the Home environment, or may be selected at random.

In addition, if a specific game comprises a peer-to-peer aspect, or supports in-game speech communication between players in a peer-to-peer fashion, a peer-to-peer evaluation between members of the group can be implemented in similar fashion, thereby ranking the members. The Member with the worst rank may be prompted or forced to leave the group if their evaluation crosses a threshold difference from that of the group, in a manner similar to when evaluating members with respect to their server connectivity as described above. In this case, being prompted or forced to leave may also be dependent on whether a timely peer-to-peer connection is critical to normal play of the game, or would simply inconvenience the user of the slowest member entertainment device.

In another embodiment, some or all of the above server evaluation and selection strategies are conducted by the Home environment server (comprising suitably corresponding game server evaluation and selection means 2014, 2016) which, for example, can collate ping data sent by members of the group to determine a game server ranking for the group, determine whether to prompt or force any members to leave the group, and select a server for the group, in a similar manner to that described above.

In the above evaluations of game servers and peers, the evaluations and server selection can be a background activity, or the results (or part thereof, such as top-ten rankings) can be displayed, either within a pop-up window, or via a suitable interface within the Home environment such as a TV or departure board, or a virtual PSP 1072. Where the evaluation and selection is a background activity, in an embodiment of the present invention a pop-up screen, text bubble or other notification within the Home environment can inform the group that a server is available that can accommodate them, optionally also giving the average ping within the group. Further optionally, the ping of each group member could be displayed over the head of the corresponding avatar, and further optionally this could be colour coded, with those a threshold level below average coloured green, those around average coloured amber and those a threshold level above average coloured red.

Alternatively, the game servers and their connection speeds and/or other connection aspects can be listed to the users in the group, who can then vote among themselves as to which server to use.

The members of the group can then exit the Home environment in a coordinated fashion in order to play their chosen game. Either one user (for example, the creator of a nominated group) can declare it is time for the group to leave, thereby initiating an exit procedure, or a user can poll other users in the group by pressing a button on the controller 751, causing their avatar to raise their hand and a text bubble to say 'Vote to go?' or similar; other players can vote, their avatars raising their hands in assent. When more than half the group have voted to go, the exit procedure is initiated. The exit procedure can also be initiated if the group reaches a target size (for example the maximum size supported by any available server, or some other default size), of if a sufficient proportion of users within the group perform a specific action, such as walking toward a departure gate (or other relevant area or item) within the Home environment.

In an embodiment of the present invention, the exit procedure simply exits the Home environment for all members of the group. Alternatively, users are given a time period (for example 30 seconds) to decide whether they really want to quit with the group at this point. In different embodiments, users can exit at any time during this period, or elect to be exited at the end of the period.

In either event, the exit procedure also stores the network address of the selected server in a manner accessible to the subsequent game using a storage means. This storage means may be the memory 500 of the PS3, its hard disk 400 or a memory card 420, or it may be storage by proxy, communicating with the Home environment server (or another default information server) and using it to store the information. Optionally, the network addresses of the top few ranked servers may be stored in this manner. Further optionally, the network addresses of the other members of the group may be stored in this manner.

In an embodiment of the present invention, the exit procedure also configures the PS3 to immediately load the chosen game. Alternatively or in addition, the PS3 can be configured to prompt the user to load the game (for example if the game disk is not currently mounted in their PS3), or to simply exit as normal, leaving the user to load the game themselves.

It will be appreciated that the availability of spaces on servers fluctuates rapidly as different groups and individuals leave and connect to servers all the time. Therefore it is desirable to conduct an evaluation and selection as close to the point of exit from the Home environment as possible.

In an embodiment of the present invention, the evaluation and selection is therefore performed for the first time during the exit procedure, with the exit procedure being aborted if no server with an aggregate ping below a threshold level can be found, or if no server with the available capacity can be found, or if one or more members may require prompting to leave.

In an embodiment of the present invention, the evaluation and selection is performed during assembly of the group as described above, and then again during the exit procedure. Optionally, to reduce the time the evaluation takes it is only performed on the top N ranking servers from the previous evaluation, where N is for example 3, but optionally can be adjusted dependent on historical ping values (for example, comparatively low pings previously can result in an increase in the number of re-evaluated servers N). The option to prompt or force members to leave, if in use, can be suspended for this last evaluation on the assumption that the current members have already been evaluated once before.

Only if none of the servers in the top N list can accommodate the group is a full evaluation and selection performed again.

The user's PS3's can display a status message like 'Confirming availability . . . ' during this process, which will typically take less than second if ping values are low.

In an embodiment of the present invention, the exit procedure does not involve further evaluation and selection beyond that done during assembly of the group.

Alternatively or in addition, the server selection means 16 can request that the selected game server reserves spaces for the users (identified by the network addresses of their PS3s) for M seconds, where M provides sufficient time for the PS3 to exit the Home environment and load the chosen game (at least to the extent that the chosen game can connect to the server itself). Preferably reservations are made for selections that occur during the exit procedure, as these have a high likelihood of being taken up. This avoids serves being effectively blocked as groups assemble and repeatedly reserve servers. Nevertheless, optionally reservations of selected servers may also occur during assembly of the group.

As an alternative to identification by network addresses, cryptographic keys may be used to authenticate group members with the game server.

In another embodiment, some or all of the above reservation strategy is conducted by the Home environment server (comprising suitably corresponding game server selection means 2016) which, for example, can make the reservation with the game server and then inform the members of the reservation time limit.

The chosen game 18a uses a server selection data retrieval means 18b for retrieve the stored server data, either local to the PS3 or on the Home environment server (or another server that provides such storage by default). This retrieval means can either be part of the game code or separate and accessed by the game via an API. The game can then connect to the selected server in a manner conventional to the game. As noted above, this connection may be subject to the PS3 being recognised by the server as having a reservation.

In an embodiment of the present invention, the game does not begin a session until a threshold proportion of the group members have connected. Where the server was reserved, the server can determine this. Alternatively or in addition, the game can share its connectivity status in a peer-to-peer fashion if the stored server data also comprised the network addresses of the PS3s in the group, as noted above.

Figure 12:
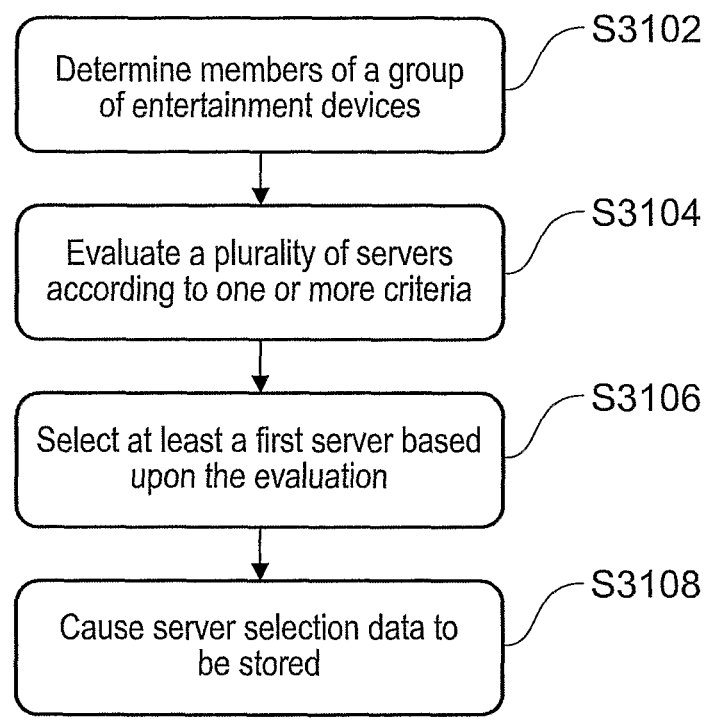
FIG. 12 is a flow chart of a method of multiplayer gaming in accordance with an embodiment of the present invention.

Referring now to FIG. 12, a method of multiplayer game access corresponding to operations of the PS3 as described above comprises a first step s3102 of determining the members of a group of PS3s connected to an instance of the Home environment, which typically comprises a plurality of additional connected users. In a second step s3104, a plurality of servers are evaluated according to one or more criteria, such as for example ping time. In a third step s3106, at least one server, typically the one best meeting the performance criteria according to the step s3104, is selected. In a fourth step s3108, the PS3 causes the storage data indicating this selection, either locally on the PS3 or remotely on the Home environment server (or some other default information server).

It will be apparent to a person skilled in the art that variations in the above method corresponding to operations of the variations in apparatus disclosed herein are considered to be within the scope of the present invention, including but not limited to:

implementation by the Home environment server of steps s3104, s3106 and storage or transmission of the selection result;
implementation by the Home environment server additionally of step s3102;
group determination according to avatar position with respect to other avatars or areas of the Home environment;
peer-to-peer ranking;
reserving spaces with the selected game server; and
retrieving server selection data for use by a game.

As noted previously, whilst a group is assembling, users may play amusements that are themed or representative of the game that the group intends to subsequently play on-line. As noted previously, a developer/publisher zone 1030 comprises supplementary software modules to the Home environment and typically comprises additional 3D models and textures to provide the structure and appearance of the zone. In addition, the software operable to implement the Home environment supports the integration of third party software via an application program interface (API). Therefore, developers can integrate their own functional content within the Home environment of their own zone, for example in the form of samples of their own published or imminent games. As noted previously, in an example of the developer/publisher zone 1030, a user's avatar can enter a room resembling a scene from the featured game. Here the user can interact with other characters from the game, and play out a key scene, or exercise a key skill.

It will be appreciated that the user may not have all of the separate games corresponding with those sample games available within the Home environment. Consequently, a user may purchase or order a game whilst within the game's area of influence (i.e. within the game space itself, and/or an annex, entryway or associated booth) in the manner described previously for purchasing goods or services within the Home environment.

It will be appreciated that in embodiments of the present invention, elements of the apparatus and method of multiplayer gaming may be implemented by computer in any suitable manner, in either hardware or software, and may reside wholly on one computer or partially also on a second. For example, the apparatus may reside wholly on the PS3, or partially also on the Home environment server.

Thus adapting parts of a conventional equivalent device may comprise for example reprogramming one or more processors therein. As such the required adaptation may be augmented in the form of a computer program product comprising processor implementable instructions stored on a data carrier such as a floppy disk, optical disk, PROM, RAM, flash memory or any combination of these or other storage media, or be transmitted via data signals on a network such as Ethernet, a wireless network, the Internet, or any combination of these or other networks.

It will be appreciated that the term "entertainment device" can encompass many types of data processing device, not just dedicated games machines.

The invention claimed is:

1. An entertainment device operable to connect to an instance of a first on-line virtual environment associated with a first game, and comprising a plurality of connected entertainment devices, the entertainment device comprising:
a group membership selector operable to select members of a group of entertainment devices connected to the instance of the first on-line virtual environment;
a server evaluator operable to evaluate a plurality of servers of a second on-line virtual environment associated with a second and different game according to one or more server selection criteria, whilst the entertainment device is connected to the first on-line virtual environment;
a server selector operable to select at least a first server of the second on-line virtual environment based upon the evaluation whilst the entertainment device is connected to the instance of the first on-line virtual environment; and
a storage arrangement operable to cause the storage of server selection data defining the selected server;
in which a server selection criterion is a vote for a server by users of the member entertainment devices.

2. An entertainment device according to claim 1 in which the server selection criterion is at least a first aspect of the connection between a member entertainment device and a server under evaluation.

3. An entertainment device according to claim 2 in which an aspect of connection is any one of:
  i. round-trip connection speed;
  ii. one-way connection speed;
  iii. signal strength;
  iv. bit error rate, and
  v. data bandwidth.

4. An entertainment device according to claim 1 in which the server evaluator is operable to collate measurements received from some or all members of the group for evaluation according to the one or more criteria.

5. An entertainment device according to claim 1 in which the group membership selector is operable to select group members according to one or more of the following conditions:
  i. selection of a nominated group by a user of the entertainment device;

ii. proximity of two or more user avatars within the first on-line virtual environment;
iii. positioning of a user avatar within a specific region of the first on-line virtual environment;
iv. a user's skill level in a game;
v. a user's age; and
vi. game-specific preferences.

6. An entertainment device according to claim 1, in which the storage arrangement comprises a communication arrangement for transmitting the server selection data to an information server commonly accessible by the members of the group.

7. An entertainment device according to claim 1, in which the storage arrangement is local to the entertainment device.

8. An entertainment device according to claim 1, in which the server evaluator is operable to evaluate whether removal of a particular member of the group would allow selection of a different server that, for the remaining members of the group, performs better according to the one or more criteria.

9. An entertainment device according to claim 1, in which the server selector is operable to request that the selected server reserves spaces for members of the group.

10. An entertainment device according to claim 9, in which the server selector is operable to transmit the network addresses of the members of the group to the selected server.

11. An entertainment device according to claim 9, in which the server selector is operable to transmit cryptographic keys associated with the members of the group to the selected server.

12. An entertainment device according to claim 1, further comprising:
a game application, and
a server selection data retriever operable to retrieve server selection data using the storage arrangement and to convey it to the game application.

13. An entertainment device according to claim 12, in which the game application is arranged to connect to a server specified by the server selection data.

14. An entertainment device according to claim 1, in which the instance of the first on-line virtual environment comprises a plurality of substantially similar instances of the first on-line virtual environment, wherein the entertainment device is connected to a first instance of the plurality of substantially similar instances of the first on-line virtual environment.

15. An entertainment device according to claim 14, in which the first on-line virtual environment supports a chat facility.

16. An entertainment device according to claim 14, wherein the member entertainment devices have corresponding avatars, and in which the member entertainment devices whose corresponding avatars are within a common area are operable to establish a peer-to-peer connection.

17. An entertainment device according to claim 14, in which the first on-line virtual environment comprises one or more areas where the entertainment devices only communicate peer-to-peer.

18. An entertainment device according to claim 16, in which the first on-line virtual environment supports peer-to-peer voice communication.

19. An entertainment device according to claim 14, in which the first on-line virtual environment provides an interface by which a text message may be entered, and subsequently routed, to a mobile phone.

20. An entertainment device according to claim 14, further comprising a display generator arranged to generate for display a 3D representation of the first instance of the plurality of substantially similar instances of the first on-line virtual environment and to generate for display within the 3D representation an avatar controlled by the user of the entertainment device and one or more avatars controlled by users of other entertainment devices connected to the same instance of the first on-line virtual environment.

21. An entertainment device according to claim 19, in which objects within the first on-line virtual environment are associated with identity data.

22. An entertainment device according to claim 21, in which the identity data enables reconstruction of user-defined aspects of the first on-line virtual environment between connected devices by transmission of a number and a position of the item.

23. An entertainment device according to claim 21, in which the identity data enables the ordering of an item or service corresponding to that identity data.

24. A method of multiplayer game access for an entertainment device, the method comprising the steps of:
selecting members of a group of entertainment devices connected to a first on-line virtual environment associated with a first game comprising a plurality of connected entertainment devices;
evaluating, by a processor, a plurality of servers of a second on-line virtual environment associated with a second game according to one or more server selection criteria whilst connected to the first on-line virtual environment;
selecting, by the processor, at least a first server of a second on-line virtual environment based upon the evaluation whilst connected to the first on-line virtual environment; and
causing the storage of server selection data defining the selected server;
in which a server selection criterion is a vote for a server by users of the member entertainment devices.

25. A method of multiplayer game access according to claim 24, in which a server selection criterion is at least a first aspect of the connection between a member entertainment device and a server under evaluation.

26. A method of multiplayer game access according to claim 25, in which an aspect of connection is any one of:
i. round-trip connection speed;
ii. one-way connection speed;
iii. signal strength;
iv. bit error rate, and
v. data bandwidth.

27. A method of multiplayer game access according to claim 24, in which the step of evaluation comprises collating measurements received from some or all members of the group for evaluation according to the one or more criteria.

28. A method of multiplayer game access according to claim 24, in which the group membership selection step comprises selecting group members according to one or more of the following conditions:
i. selection of a nominated group by a user of the entertainment device;
ii. proximity of two or more user avatars within the first on-line virtual environment;
iii. positioning of a user avatar within a specific region of the first on-line virtual environment;
iv. a user's skill level in a game;
v. a user's age; and
vi. game-specific preferences.

29. A method of multiplayer game access according to claim 24, in which the server selection data is caused to be stored on an information server commonly accessible by the members of the group.

30. A method of multiplayer game access according to claim 24, in which the server selection data is caused to be stored on an entertainment device.

31. A method of multiplayer game access according to claim 24, in which the server evaluation step comprises evaluating whether removal of a particular member of the group would allow selection of a different server that, for the remaining members of the group, performs better according to the one or more criteria.

32. A method of multiplayer game access according to claim 24, in which the server selection step comprises requesting that the selected server reserves spaces for members of the group.

33. A method of multiplayer game access according to claim 32, in which the server selection step comprises transmitting the network addresses of the members of the group to the selected server.

34. A method of multiplayer game access according to claim 32, in which the server selection step comprises transmitting cryptographic keys associated with the members of the group to the selected server.

35. A method of multiplayer game access according to claim 24, comprising the step of retrieving server selection data and conveying it to a game application.

36. A method of multiplayer game access according to claim 24, comprising the step of connecting the game application to a server specified by the server selection data.

37. A non-transitory computer-readable data carrier storing computer readable instructions thereon, the instructions, when executed by a computer, cause the computer to operate as an entertainment device according to claim 1.

38. A non-transitory computer-readable data carrier storing computer readable instructions thereon, the instructions, when executed by a computer, cause the computer to carry out the method of claim 24.

39. An entertainment device operable to connect to an instance of a first on-line virtual environment associated with a first game, and comprising a plurality of connected entertainment devices, the entertainment device comprising:

a group membership selector operable to select members of a group of entertainment devices connected to the instance of the first on-line virtual environment;

a server evaluator operable to evaluate a plurality of servers of a second on-line virtual environment associated with a second and different game according to one or more server selection criteria, whilst the entertainment device is connected to the first on-line virtual environment;

a server selector operable to select at least a first server of the second on-line virtual environment based upon the evaluation whilst the entertainment device is connected to the instance of the first on-line virtual environment;

a storage arrangement operable to cause the storage of server selection data defining the selected server;

in which the instance of the first on-line virtual environment comprises a plurality of substantially similar instances of the first on-line virtual environment, wherein the entertainment device is connected to a first instance of the plurality of substantially similar instances of the first on-line virtual environment; and the entertainment device further comprising a display generator arranged to generate for display a 3D representation of the first instance of the plurality of substantially similar instances of the first on-line virtual environment and to generate for display within the 3D representation an avatar controlled by the user of the entertainment device and one or more avatars controlled by users of other entertainment devices connected to the same instance of the first on-line virtual environment;

in which the first on-line virtual environment provides a facility to highlight the avatars of users with whom the user of the entertainment device has recently communicated.

\* \* \* \* \*